US009150161B2

(12) United States Patent
Laverack et al.

(10) Patent No.: US 9,150,161 B2
(45) Date of Patent: Oct. 6, 2015

(54) VEHICULAR LOAD CARRIER RACK WITH LOCKING COVER

(71) Applicant: Thule Sweden AB, Hillerstorp (SE)

(72) Inventors: John R. Laverack, Southbury, CT (US); Steven Robert Perry, Tiverton, RI (US)

(73) Assignee: THULE SWEDEN AB, Hillerstorp (SE)

( * ) Notice: Subject to any disclaimer, the term of this patent is extended or adjusted under 35 U.S.C. 154(b) by 126 days.

(21) Appl. No.: 13/946,714

(22) Filed: Jul. 19, 2013

(65) Prior Publication Data

US 2014/0034694 A1 Feb. 6, 2014

Related U.S. Application Data

(60) Provisional application No. 61/678,081, filed on Jul. 31, 2012.

(51) Int. Cl.
*B60R 9/06* (2006.01)
*F16B 2/06* (2006.01)
*B60R 9/045* (2006.01)
*B60R 9/058* (2006.01)

(52) U.S. Cl.
CPC . *B60R 9/06* (2013.01); *B60R 9/045* (2013.01); *B60R 9/058* (2013.01); *F16B 2/06* (2013.01); *Y10T 403/58* (2015.01)

(58) Field of Classification Search
CPC .......... B60R 9/06; B60R 9/058; B60R 9/045; F16B 2/06; Y10T 403/58
USPC .............................................. 224/405; 70/232
See application file for complete search history.

(56) References Cited

U.S. PATENT DOCUMENTS

| 2,615,323 | A | * | 10/1952 | Budisch | 70/232 |
| 4,228,983 | A | * | 10/1980 | Bowman, Jr. | 248/553 |
| 5,310,238 | A | * | 5/1994 | Wheatley | 296/100.18 |
| 6,109,077 | A | * | 8/2000 | Lee | 70/232 |

* cited by examiner

*Primary Examiner* — Adam Waggenspack
(74) *Attorney, Agent, or Firm* — Novak Druce Connolly Bove + Quigg LLP

(57) ABSTRACT

Vehicular mounted load carrier racks can include a lock cover to shroud an operator-engageable portion of a clamp device from unauthorized access in an installed and locked position. The operator-engageable portion can secure and release the clamp device to and from a surface such as a vehicle. The locking cover can be mounted in an installed and locked position on the clamp device to shroud the operator-engageable portion of the clamp device from unauthorized access in the installed and locked position. The locking can comprise a cover body and a lock. The cover body can have perimeter walls defining a receiving cavity within which the operator-engageable portion of a respective clamp device is located in the installed and locked position of the cover body on the clamp device. The lock can be coupled to the cover body. The lock can have an engagement portion transitional between locked and unlocked configurations.

25 Claims, 29 Drawing Sheets

VEHICULAR LOAD CARRIER RACK WITH LOCKING COVER

CROSS-REFERENCE TO RELATED APPLICATION

This application claims priority to U.S. Provisional Application No. 61/678,081, filed Jul. 31, 2012, the contents of which are entirely incorporated by reference herein.

FIELD

The subject matter herein generally relates to a load carrier rack for a vehicle.

BACKGROUND

Vehicle racks can be load bearing frame-like structures installable on the bed of pick-up trucks for carrying various articles thereon. Generally racks have a base portion for directly attaching to the bed rails of a pick-up truck. Racks typically, also have an upper portion, for example cross bars which extend above and across the bed of the truck.

BRIEF DESCRIPTION OF THE DRAWINGS

Implementations of the present technology will now be described, by way of example only, with reference to the attached figures, wherein.

DETAILED DESCRIPTION

Figure 1:
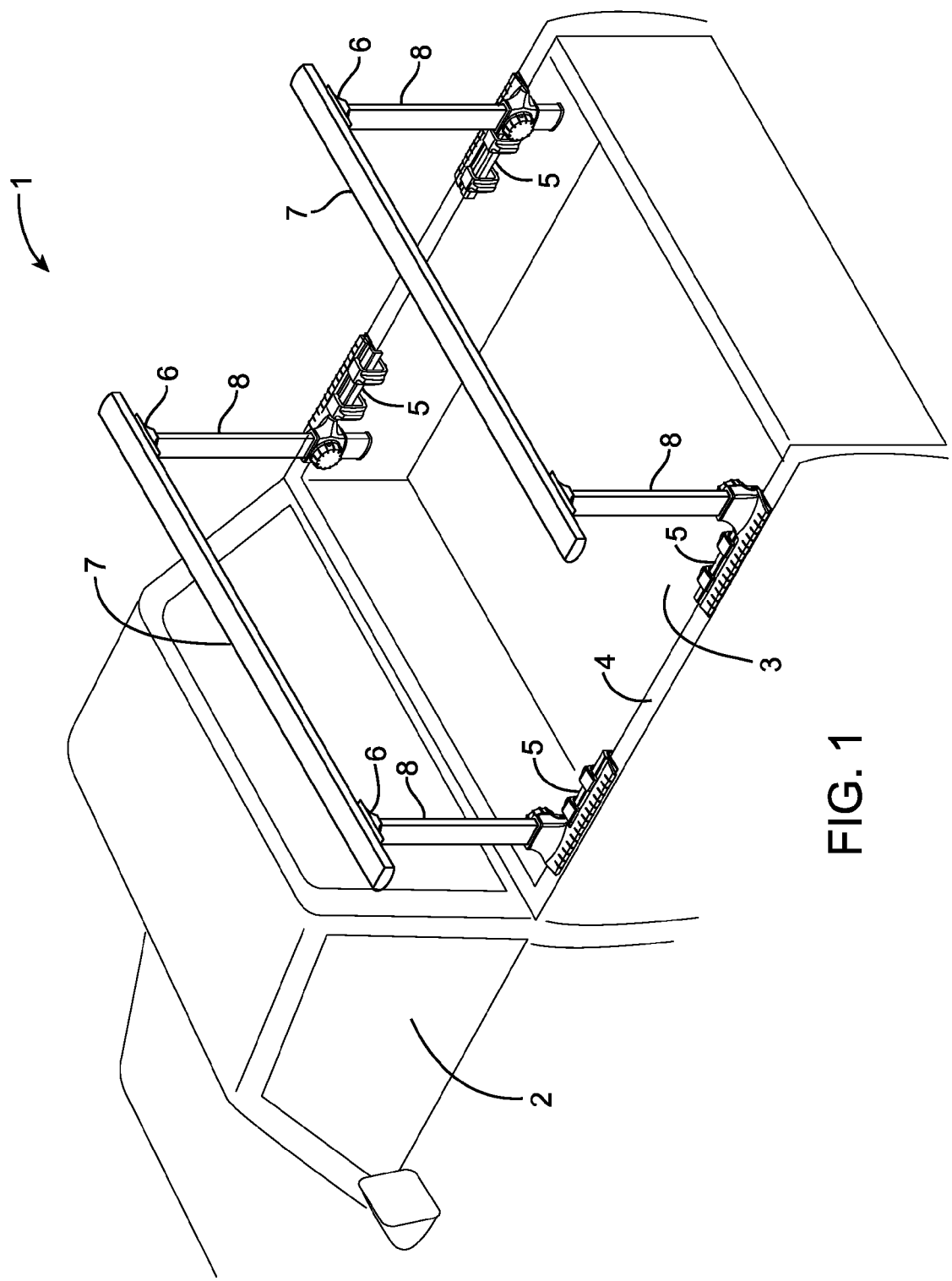
FIG. 1 is an illustration of a load carrier rack depicted on a pick-up truck.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations described herein.

The present disclosure concerns various components that can be implemented in association with a load carrier rack. While the illustrated examples are provided in relation to a load carrier rack, certain components can be implemented with other devices.

At least one example embodiment of a load carrier rack disclosed herein includes a base member mountable on a portion of the vehicle; an upright leg extending from the base member, the upright leg being slidably received by the base member; an interference mechanism including interference surface, the interference mechanism configured to have at least an actuated configuration and a released configuration, wherein: in the actuated configuration, the interference surface is engaged with the upright leg to resist movement of the upright leg relative the base; and in the release configuration, the interference surface is disengaged from the upright leg to permit movement of the upright leg relative said base.

In other example implementations, the interference surface is an elongate projection. Further, the upright leg can be elongate and have a set of grooves along a portion of its length. In other example implementations, in the actuated configuration, the elongate projection engages one of the set of grooves thereby mechanically locking the upright leg. In other embodiments, the interference mechanism includes a rotatable handle, which when rotated moves the interference surface between engagement with the upright leg in the actuated configuration and disengagement from the upright leg in the release configuration. Additionally, the elongate projection can extend from the rotatable handle.

In other example implementations, the interference mechanism further includes a compression bolt, which can extend to within the upright leg, and whereupon actuation of the rotatable handle the elongate projection is caused to move into engagement with the upright leg, the compression bolt providing a simultaneous counterforce to compress a portion of the upright leg against the interference surface. In further example implementations, the compression bolt can extend from the underside of the rotatable handle, and has a flanged end piece extending within the upright leg. In additional example implementations, the rotatable handle can include a threaded aperture, and wherein the compression bolt is insertable within the threaded aperture, and whereupon actuation of the rotatable handle, the compression bolt is drawn within the threaded aperture and the compression bolt flanged end piece is simultaneously compressed against an internal surface of the upright leg providing a counterforce compressing the upright leg against the interference surface.

In at least one implementation of the height adjustable load carrier, a plurality of position labels signifying individual ones of a plurality of discrete position settings can be included on a demarcated portion of the upright leg. The upright leg can be configured to be variously coupled to the base member at discrete locations along a length of the upright leg. The base member can be configured to alternately engage with each of the plurality of the discrete locations along the length of the upright leg for height-setting the load carrier rack in dependence upon user-selection among the position labels of the demarcated portion of the upright leg.

In at least one implementation, a plurality of base members, each mountable on a vehicle can be implemented in conjunction with a plurality of upright legs configured to be variously coupled, one each to a respective one of the plurality of base members, at discrete locations along a length of the respective upright leg. The plurality of base members can number four and the plurality of upright legs can number four.

Positions of a leg relative to its base can be label, and which correspond to the several discrete locations on the leg where engagement can be made. In one implementation, each position label is alphabetic. In another implementation, each position label is numeric. In yet another implementation, each position label is alphanumeric.

In at least one implementation, each of the upright legs has a top end. The demarcated portion of each upright leg is similarly positioned with respect to the top end of the respective upright leg; and each top end of the upright legs is configured to engage with an upper support. The plurality of discrete locations along the length of the upright leg with which the base member alternately engages can be formed by a series of alternating troughs and ridges. The series of alternating troughs and ridges that form the plurality of discrete locations along the length of the upright leg can be formed in a strip of material attached to the upright leg. In yet another implementation, the series of alternating troughs and ridges that form the plurality of discrete locations along the length of the upright leg can be formed in a strip of material releasably coupled to the upright leg. In still another implementation, the series of alternating troughs and ridges that form the plurality of discrete locations along the length of the upright leg can be formed in a strip of material coupled to the upright leg.

The plurality of position labels can be demarcated on the strip of material coupled to the upright leg on which the series of alternating troughs and ridges are formed. In another implementation, the plurality of position labels are not demarcated on the strip of material coupled to the upright leg and are instead located on another portion of the upright leg. In at least one implementation, the plurality of demarcated position labels are printed on the strip of material coupled to the upright leg on which the series of alternating troughs and ridges are formed. In yet another implementation, the plurality of demarcated position labels are embossed upon the strip of material coupled to the upright leg on which the series of alternating troughs and ridges are formed. In still another implementation, the plurality of demarcated position labels are debossed into the strip of material coupled to the upright leg on which the series of alternating troughs and ridges are formed.

In one implementation, the plurality of demarcated position labels can be arranged in a consecutive series spaced apart at the same distance as the spacing between a consecutive series of troughs of the series of alternating troughs and ridges. Each of the plurality of demarcated position labels can be positioned parallel to respective ones of the troughs of the series of alternating troughs and ridges relative to a longitudinal axis of the strip of material comprising the labels and troughs. In another implementation, each of the plurality of demarcated position labels can be longitudinally offset from any one of the troughs of the series of alternating troughs and ridges relative to a longitudinal axis of the strip of material comprising the labels and troughs. In one implementation, each of the upright legs can be predominantly constructed from metal. The strip of material comprising the labels and troughs is predominantly constructed from plastic.

A blocking device for preventing unauthorized or unwanted disengagement or removal of a upright leg of a load carrier, such as a rack, mounted to a vehicle via a base member is disclosed. The blocking device can be removably attached to a base member, which can in turn be removably attached to a portion of a vehicle, such as the rail of a pickup truck. If one or more of the legs of a load carrier attached to the vehicle by means of base member has a blocking device, the risk that the load carrier will be improperly removed from the vehicle can be reduced. The base member can be configured with a receiving passage running there-through. The passage can wholly or partially surround a leg of the carrier and enable the upright leg to reciprocate up and down. The removable blocking device, however, can limit upward reciprocation to prevent unauthorized removal. Thus a base member attached to a vehicle can allow the legs of a load carrier to be adjusted up and down, while the blocking device is used to prevent an unauthorized user from moving a leg all the way up through the base member.

The blocking device can be sized and configured such that, at the point of maximum desired upward reciprocation, the removable blocking device will abut or press against the base member near a lower opening of the receiving passage. A blocking device can include an interference portion or section which can be releasably or removably coupled or joined to the bottom or lower end of a leg of a load carrier. An interference portion or section can be removably or releasably couplable or attachable to the end of a leg of a load carrier. The interference portion can be configured or sized to have a dimension that is greater or larger than a corresponding dimension of the bottom or lower opening of the receiving passage through the base member. The interference portion can include an abutment surface configured to wholly or partially engage the base member at the lower opening at the point of maximum appropriate vertical or upward reciprocation. Thus, in order to move a carrier leg all the way through the receiving passage in the base member, and thereby disengage the leg from a vehicle, a user must first remove the blocking device from the leg. Unauthorized removal can be achieved by means of a lock at least partially housed within, and fixedly attached to, the blocking device. The lock can be configured with a locked configuration in which the removable blocking device is locked to the upright leg, and an unlocked configuration in which the removable blocking device is released, or becomes removable from, the upright leg. The lock can be translational or switchable between the locked configuration and the unlocked configuration.

In at least one embodiment, the blocking device can include an insert portion which is configured to be received by an opening in the upright leg and thereby releasably secured to the leg. The interference portion can in turn be coupled to a lower end of the insert portion, and the lock for securing the blocking device to the base can be at least partially contained within the insert portion. In at least one embodiment, the insert portion can be co-molded with the interference portion.

In at least one embodiment of the removable blocking device the insert portion can include a bottom portion which adjoins the interference portion and which is wider than a top portion of the blocking device. The top portion can comprise two side walls each wall having one or more openings. The top portion can comprise two side walls through which a pair of openings is formed.

In at least one embodiment of the removable blocking device, each of the of openings can be sized to permit or enable a portion of the lock to extend there-through and engage corresponding lock receiving portions on the upright leg.

In at least one embodiment, the interference portion can contain or include a long axis and a short axis. The axes can correspond to the long dimension and short dimension of the interference portion, respectively. A length of the interference portion in the direction of the long axis can greater in size than a corresponding length of the lower opening to the receiving passage, thereby preventing unauthorized removal of a leg. The interference portion can be so configured such that a width of the interference portion in the direction of the short axis is greater than a corresponding width of the lower opening to the receiving passage, thereby preventing unauthorized removal.

In at least one embodiment, the abutment surface of the interference portion described above can be comprised by or comprised on a perimeter about the interference portion.

In at least embodiment within the disclosure, a lockable retaining system for an upright leg which extends from a base a base is disclosed. The lockable retaining system can comprise an upright leg and a removable blocking device for preventing disengagement of an upright leg from a base member. A removable blocking device can include an interference portion which is releasably coupled to a lower distal end of the upright leg. The interference portion can have a dimension that is greater than a corresponding dimension of the lower opening to the receiving passage through the base member. The interference portion can also include an abutment surface which is configured to blockingly engage the base member at or near the lower opening of the receiving passage in the base member. The interference portion can incorporate a lock which is contained at least partially within the removable blocking device, with the lock being transitional between a locked configuration in which the removable blocking device is locked to the upright leg and an unlocked configuration in which the removable blocking device is released or unlocked from the upright leg.

In at least one embodiment of a lockable retaining system, a removable blocking device can comprise an insert portion which is received in an opening in the upright leg and releasably secured within the leg. The interference portion coupled to a lower distal end of the insert portion and the lock can be contained at least partially within the insert portion. A lockable retaining system can further comprise a lock retention opening formed in one end of the upright leg.

In at least one embodiment, the lockable retaining system can comprise one or more lock retention tabs formed in or on at least two sides of the lock retention opening, wherein the lock retention tabs prevent removal of the lock in the locked configuration.

In at least one embodiment of the disclosure, a lockable support arrangement for a load carrier rack is disclosed. The lockable support arrangement can comprise a base member, an upright leg inserted in a receiving passage through the base member, and a clamp device coupling the base member to a carrying vehicle. In at least one embodiment, a lockable support arrangement can include a removable blocking device for preventing disengagement of the upright leg from the base member. The removable blocking device can include an interference portion releasably coupled to a lower distal end of the upright leg, the interference portion having a dimension that is greater than a corresponding dimension of a lower opening to the receiving passage through the base member. The interference portion can have an abutment surface or region which engages the base member proximate the lower opening to the receiving passage to block unauthorized removal of the upright leg. The blocking device can further include a lock contained at least partially within the removable blocking device. The lock can exist in a locked configuration or position, in which the removable blocking device is locked to the upright leg.

In at least one embodiment within the disclosure, the lock can have a locking cover installed on a clamp device. The locking cover can include a cover body having perimeter walls defining a receiving cavity therein and within which an operator-engageable portion of the clamp device is located in an installed and locked position of the cover body shrouding the clamp device. The lock cover can itself include a second lock, coupled to the cover body and having an engagement portion transitional between locked and unlocked configurations to the clamp device. In at least one embodiment, when both the first and second locks are in locked configurations, the upright leg is locked to the base member by the first lock and the base member is locked by the second lock to the carrying vehicle by the clamp device shrouded by the locking cover.

In at least one embodiment within the disclosure, a removable blocking device can include or comprise an insert portion which can be received in an opening in the upright leg and releasably secured within the opening. The interference portion can be coupled to a lower or bottom end of the insert portion. In at least one embodiment, the lock can be at least partially contained within the insert portion.

In at least one embodiment, the lockable support arrangement load carrier rack can further comprise or include a lock retention opening which is formed in one end of the upright leg. A lockable support arrangement can also incorporate or include lock retention tabs which are formed on at least two sides of the lock retention opening, the lock retention tabs configured or place to prevent removal of the lock when in the locked configuration.

Load carrier rack systems can include a locking cover that shrouds an operator-engageable portion of a clamp device of the load carrier rack system. For example, load carrier rack systems can include a clamp device that couples the load carrier rack system to a vehicle. For example, the clamp device can be a C-clamp, a G-clamp, a miter clamp, a bench clamp, a vise, a hand screw, a setscrew, or any other device or mechanism that allows one object to clamp, grip, or otherwise couple to another object. The clamp device can have an operator-engageable portion for securing and releasing the clamp device to and from a surface, such as a vehicle. For example, the operator-engageable portion can be a bolt, a screw, a handle, a turnkey, a knob, a push-pull toggle, or any other portion that controls the securing and releasing the clamp device to and from the surface. In conventional clamp devices, the operator-engageable portion is typically exposed. Therefore, the operator-engageable portion can be accidentally moved or engaged to release or loosen the clamp from the vehicle. That is, since the operator-engageable portion of conventional clamp devices are typically exposed, the clamp device can be tampered with to release or loosen the clamp device from the vehicle. Also, since the operator-engageable portion of conventional clamp devices are typically exposed, other objects can interfere with the operator-engageable portion to release or loosen the clamp device from the vehicle. For example, if the vehicle travels over a bump or a hole in the road, the operator-engageable portion of the clamp device can bump or come in contact with a bed rail of the vehicle or an object in the vehicle that moves the clamp device, thereby loosening the clamp device from the vehicle. To prevent such tampering, unintentional interference, or undesired access to the clamp device, the load carrier rack system can include a locking cover according to the present disclosure.

A locking cover can be mounted in an installed and locked position on the clamp device (for example, each C-clamp device). The locking cover can shroud the operator-engageable portion of the clamp device from unauthorized access in the installed and locked position. Example locking covers can include a cover body having perimeter walls. The perimeter walls can define a receiving cavity. When the locking cover is mounted on the clamp device, the operator-engageable portion can be received within or located within the receiving cavity. The locking cover can also include a lock coupled to the cover body. The lock can have an engagement portion transitional between locked and unlocked configurations. In at least one embodiment, the cover body can include a clamp device engagement portion configured to engage a complimentarily configured cover engagement receiving portion of the claim device in the installed and locked position. In another example, the locking cover can include an adapter installable upon the clamp device. The adapter can be configured to receive the cover body in the installed and locked position, thereby coupling the locking cover to the clamp.

A load carrier rack 1 for a vehicle is illustrated in FIG. 1. In the illustrated example, the vehicle is a pick-up truck. In other embodiments, the load carrier rack 1 can be implemented on other vehicles. A typical pick-up truck has a forward cab 2, and a bed 3, with bed rails 4. The load carrier rack 1 can be installed on the back of the pick-up truck. In at least one implementation, the load carrier rack 1 can be installed on the bed rail 4. In other implementations, where the vehicle does not have a bed 3 or a bed rail 4, the load carrier rack can be coupled to another portion of the vehicle. In one example, the load carrier rack 1 can be coupled to the vehicle chassis either directly or indirectly.

Figure 2:
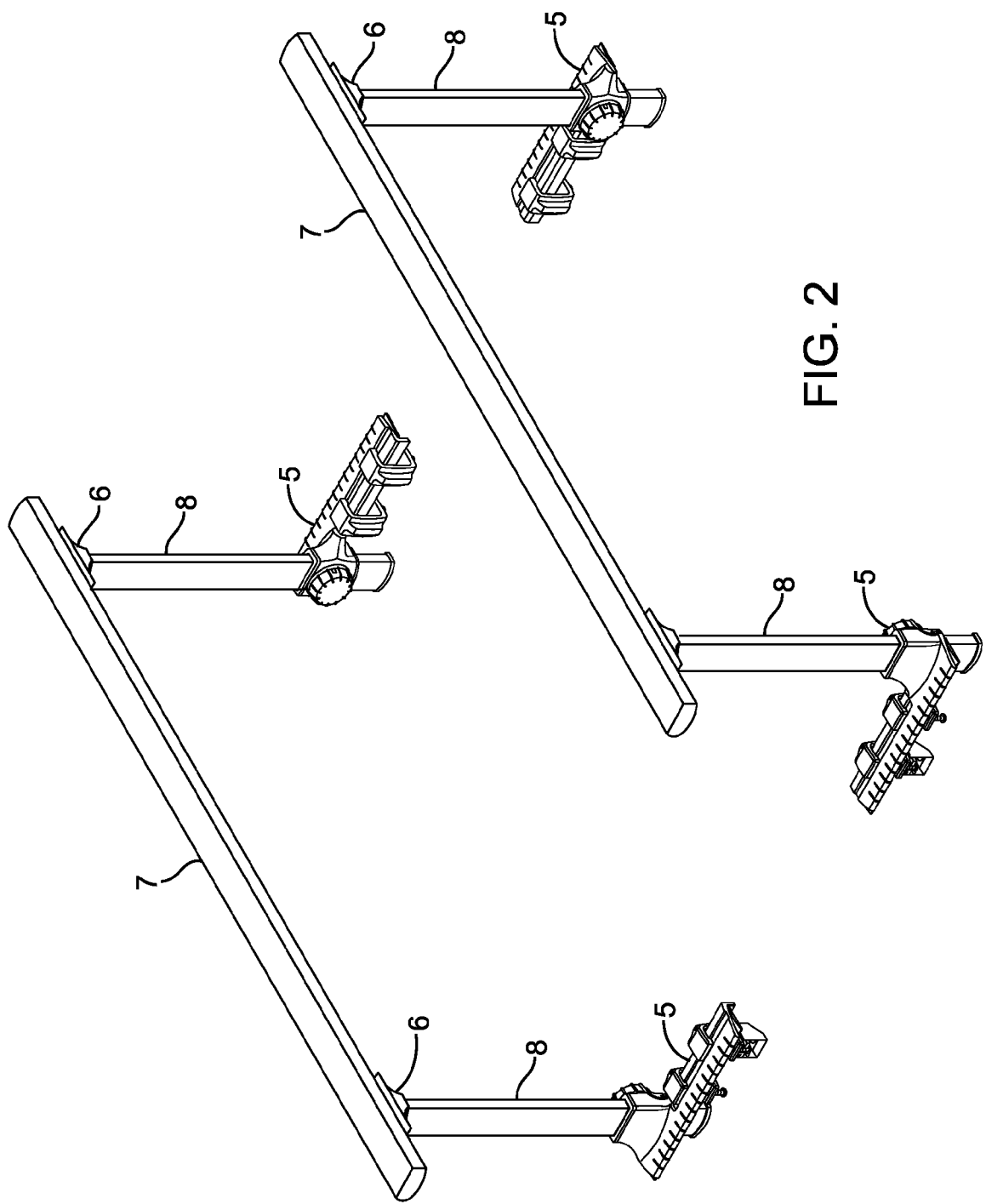
FIG. 2 is an illustration of a load carrier rack.

The load carrier rack 1 is depicted by itself in FIG. 2 and in the embodiment shown has base members 5, upper supports 6 and cross bars 7. The base members 5 are elongate and have a flat planar surface such that they can be mounted to rest horizontally on the bed rails of the truck bed. In other examples where the base member 5 is configured to be mounted to another portion of the vehicle, the base member 5 can have another shape that is configured to be mounted to the respective member of the vehicle. In yet other examples, where an additional component is implemented, the base member 5 can be configured to have a shape that is designed for coupling to the other component.

An upright leg 8 extends from a base member 5. The upright leg 8 is further coupled to the upper support 6. In other examples, there are a plurality of upright legs 8 and a plurality of base members 5. In the illustrated example, there are four upright legs 8, four base members 5, and four upper supports 6. In another example, there can be two upright legs 8, two base members 5, and two upper supports 6. In at least one example, the upper supports 6 can be made up of a bracket 9, which can also be referred to as a shoulder support. The bracket 9 can be coupled to the top of the upright leg 8. Additionally, a cross bar 7 can be coupled to the bracket 9.

Figure 3:
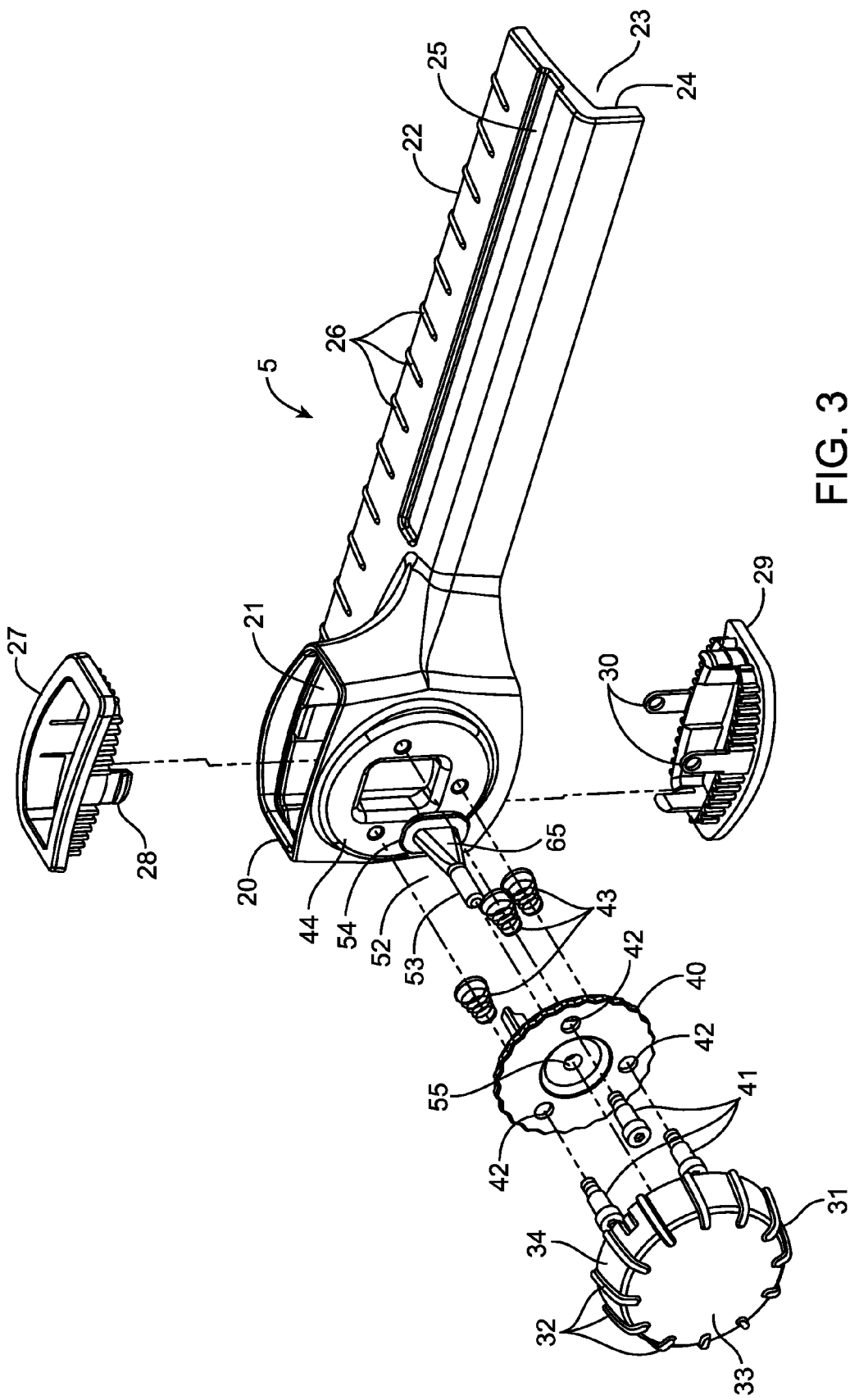
FIG. 3 is an illustration of an exploded perspective view of a base member for a load carrier rack.

Referring to FIG. 3, a close up view of a base member 5 is illustrated. As shown, the base member 5 can be generally elongate and substantially planar, so as to rest flatly and horizontally along the pickup truck bed rail when mounted thereon. The base member 5 has a receiving passage 20 with a receiving opening 21 extending through the receiving passage 20 such that the top and bottom of the receiving passage 20 is open. The receiving passage 20 receives the upright leg 8 (not shown in FIG. 3) which is configured to extend into and through the opening 21. The upright leg 8 can be slidably received in the receiving passage 20 and moveable up and down. In at least one example, the upright leg 8 can assume a plurality of positions relative to the receiving passage 20. In at least one example, the plurality of positions can include a raised and a lowered configuration. In other examples, the number of the plurality of positions can be as many as fifty positions. In yet another example, the number of the plurality of positions can be as many as forty positions. In still another example, the number of the plurality of positions can be as many as thirty positions. Other pluralities of positions are possible. Thus in at least one example, the upright legs can be raised or lowered to multiple positions in a continuous fashion to reach the desired height. Raising and lowering the upright legs 8 correspondingly also raises and lowers the upper supports 6 and cross bars 7 attached to the upper supports 6. In this way the height of the cross bars 8 can be adjusted. For example, if required, the cross bars 7 can be raised to be above the cab of the truck, the same height as the cab of the truck, or lower than the cab of the truck. While it can be desirable to have the cross bars 7 above the cab to prevent damage to the cab, it can also be desirable in at least some examples to lower the cross bars 7 so that the center of gravity of the load is lowered. In yet another example, when the cross bars are lower, the load can contribute less aerodynamic drag. Thus, a variety of options can be available to a user to vary the height of the cross bars 7 for loading articles thereon.

Additionally, a generally planar extension 22 can be coupled to the receiving passage 20. The size and shape of the planar extension 22 can be such that it will fit securely on the bed rail of a pickup truck when the base member 5 is mounted thereon. Alternatively, as indicated above, the planar extension 22 can take other forms to fit with the desired mating surface such as another component when the base member 5 is not coupled to the bed rail.

In one example, the planar extension 22 is generally flat on its undersurface for the reason that it will be mounted on top of the bed rail of a truck bed, which are also generally substantially flat or planar as well. The planar extension 22 can be elongate in shape to rest along a predetermined length of the bed rail. By resting along the predetermined length of the bed rail the weight of the load carrier structure, as well as any load thereon, can be better distributed and additionally provides a more solid base and foundation for maintaining the structure on the truck bed rail. The predetermined length can be based upon the intended load that the load carrier 1 is designed to carry.

The planar extension 22 can have an L-shaped shoulder 23 with a downward projecting edge 24. With the edge 15 and shoulder 10 fixed along the length of the planar extension 22, when placing the mount on the truck bed rail, the base member 5 can be pushed to abut the edge 24 against the side surface of the bed rail extending from the floor of the truck bed thereby providing a more secure contact.

The planar extension 22 additionally can have an elongate recess 25 running along at least a portion of its length. In other examples, the elongate recess 25 can run along the entire length of the planar extension 22. The elongate recess 25 can be configured to receive a portion of a clamp, as an aid to securement of the clamp thereon. Specifically, the elongate recess 25 can position the clamp in a desired location relative to the planar extension 22, thereby preventing the lateral movement of the planar extension 22 relative to the clamp location. Additionally, ridges 26 can be provided on the planar extension 22. The ridges 26 can provide a rough surface for a user to step on when mounted on the truck bed rail to reduce the chance of slipping.

In one example, the base member 5 can include an interference mechanism. This can also be referred to as an interference arrangement or mechanism. The interference mechanism refers to and includes components which are employed for stopping the motion of the upright legs in the receiving passage 20 at selected locations or positions. One embodiment of an interference mechanism is illustrated in FIGS. 3-7.

As illustrated in FIG. 3, the base member 5 can include a receiving passage 20. The receiving passage 20 can have a cap or lip attachment 27 with a cap extension 28 that enables the cap attachment 27 to snap-fit thereon and extend around the upper edge of the receiving passage 20. The cap attachment 27 can be sized and shaped according to the associated upright leg 8 thus providing a further secure and snug fit when the upright leg 8 is within the receiving passage 20. A lower undercap or underlip 29 is also shown which has undercap extensions 30 which further allow snap-fit onto and around the lower edge of the opening 21.

Figure 4:
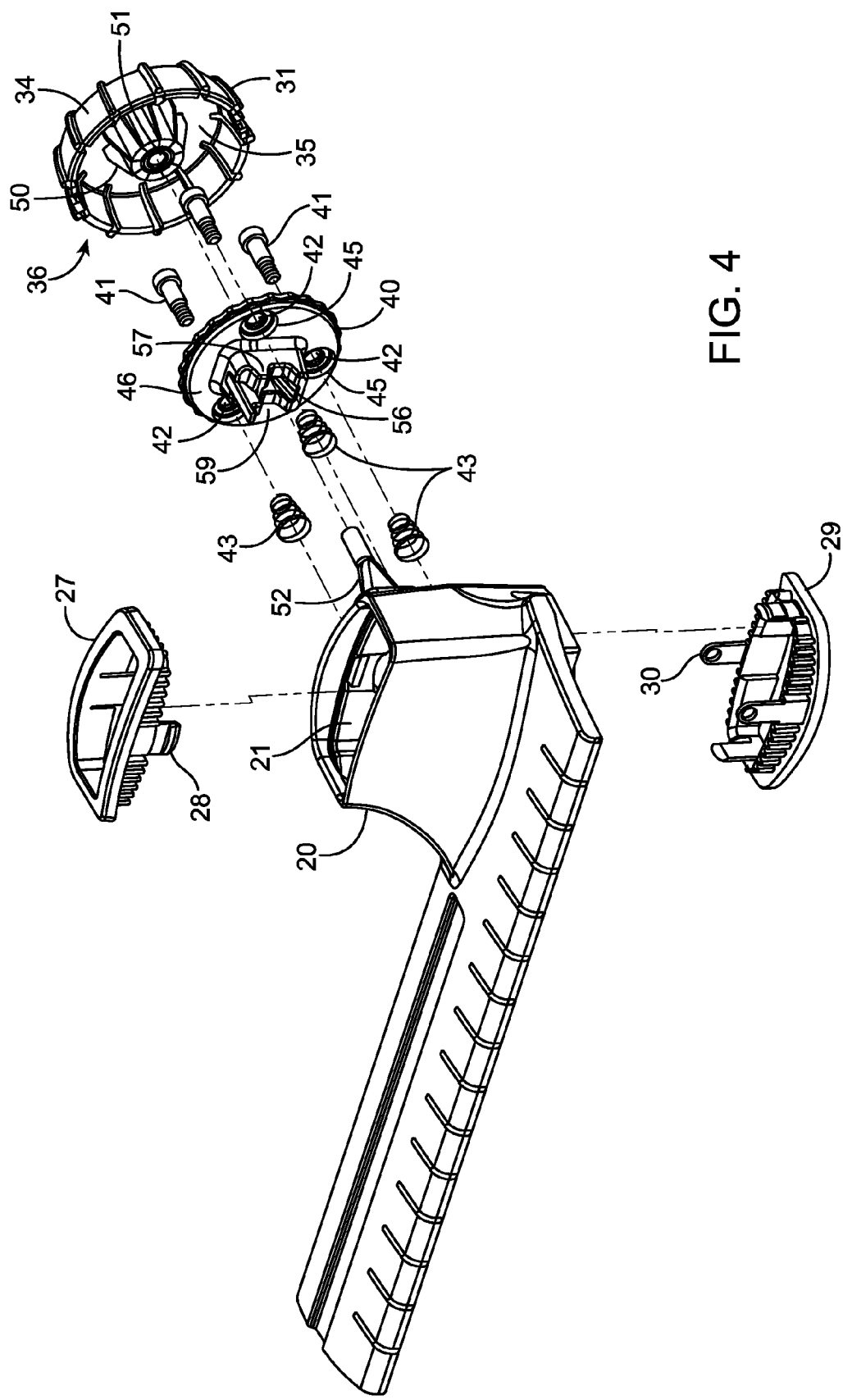
FIG. 4 is an illustration of an exploded perspective view of a base member for a load carrier rack.

An exploded view of the biasing handle 31 is illustrated in FIGS. 3-4. The exploded view illustrates components making up the biasing handle 31. In other examples, additional components can make up the biasing handle 31. In other examples, the biasing handle 31 can be refined to limit the number of components and fewer components can be provided than what has been illustrated. In FIG. 3, a biasing handle 31 is illustrated; the biasing handle 31 can be a circular rotatable handle, as illustrated. The biasing handle 31 can be any handle which is capable of providing a biasing action when actuated. Because the biasing handle 31 is circular and rotatable in the illustrated embodiment, actuation and release of the biasing handle 31 is carried out by means of turning, or rotating the handle. The biasing handle can have a plurality of ridges 32 positioned around the circumference of the handle to aid in gripping and rotation of the handle. The biasing handle 31 can have a top cover 33 and downward edges 34 extending toward the base member 5, which as shown in the perspective of FIG. 4, creates a cavity 35 in the underside 36 of the biasing handle 31. In other examples, the biasing handle 31 can have other forms to allow for a biasing action such as a lever. In other embodiments, the biasing handle 31 can include both a circular rotatable handle and a lever.

Additionally, the base member 5 can include an internal plate 40, as illustrated in FIG. 3. The internal plate 40 can fit into the underside 36 of the biasing handle 31. Three threaded fasteners 41 can be employed through corresponding apertures 42 and biasing elements 43 (conical shaped coiled springs in the depicted embodiment). The fasteners 41 can be inserted into the receiving apertures 42 and tightened therein. By tightening the fasteners 41, the internal plate 40 is fastened to the front face 44 of the side of the receiving passage 20. One, two, three, four, five or more fasteners can be employed to aid in fastening the internal plate to the front face 44. When three fasteners are implemented, an improved stability can be provided without adding excess weight. Other arrangement can have other benefits as well such as increased strength or reduced weight. Additionally, while the fasteners were described as threaded fasteners, the fasteners can have other configurations that allow for releasable engagement. In yet other implementations, the fasteners can be configured to prevent release and thereby take the form of permanent or semi-permanent fasteners.

The internal plate 40 can have indents 45 around each of the apertures 42 on the front side 46 of the internal plate 40. The biasing elements 43 can be aligned and fit within such apertures 42 when the internal plate 40 is tightened onto the front face 44. Moreover, the fasteners 41 can have a threaded portion 36 and a free portion 37. Accordingly, when the internal plate 40 is fully fastened, there is still a distance between the front side 46 of the internal plate 40 and the front face 44 of the receiving passage 20. The biasing elements 43 can be fixed between the internal plate 40 and front face 46, and act to maintain a distance between the two surfaces.

Figure 5:
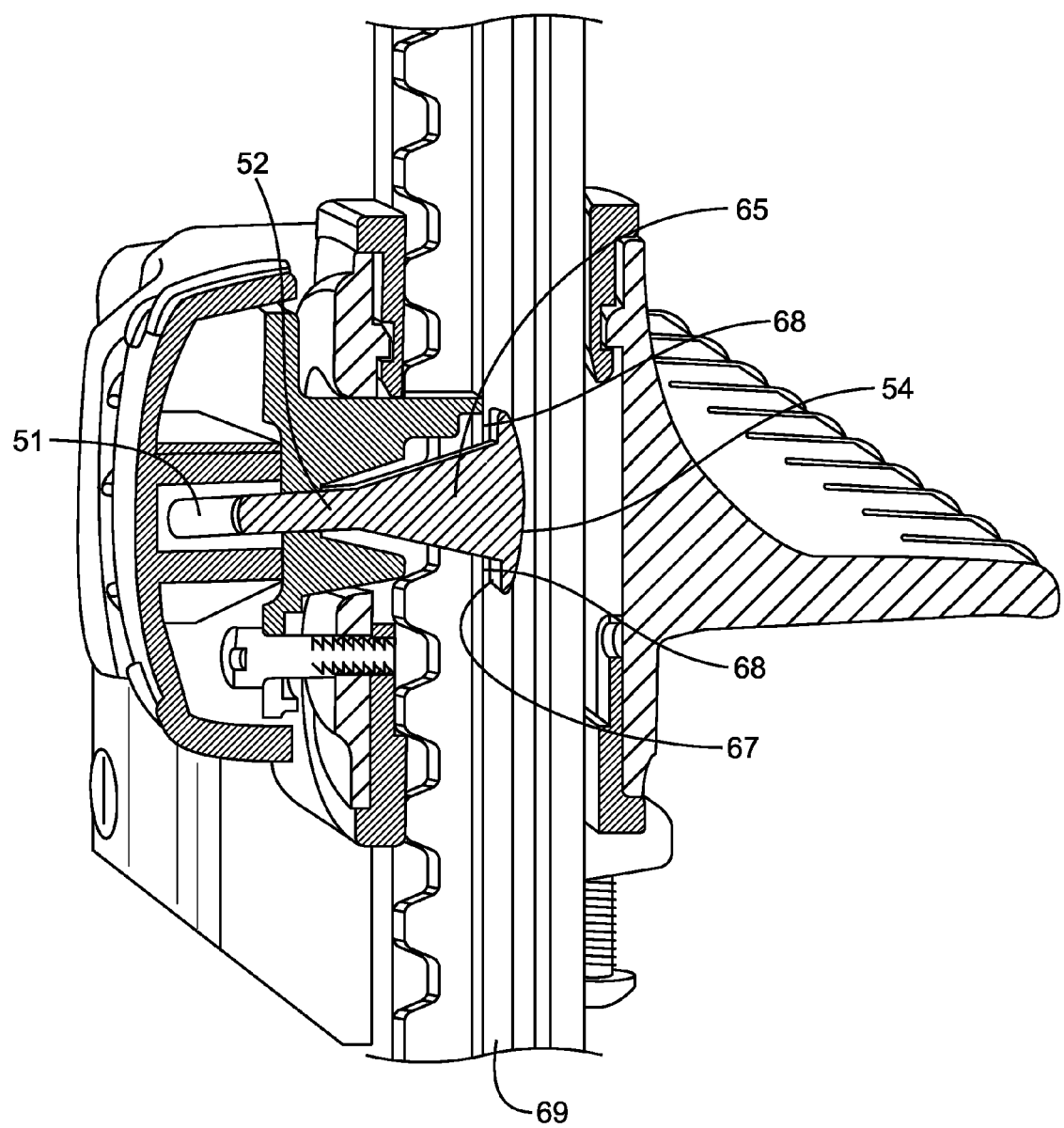
FIG. 5 is an illustration of a cross sectional view of a portion of the base member for a load carrier rack.

As shown in FIG. 4, the underside 36 of the biasing handle 31 can have a projection member 50 extending from the center of the underside of the top cover 33. The projection member 50 can have a threaded central aperture 51. A compression T-bolt 52 is also depicted and has a threaded end 53 and a flanged end 54. When the biasing handle 31 and internal plate 40 are mounted onto the base member 5, the compression T-bolt 52 passes through the central aperture 55 of the internal plate 40. Further, as shown in FIG. 5, the threaded end 53 of the compression T-bolt 52 is insertable into the threaded central aperture 51 on the underside of the biasing handle 31.

As shown in FIG. 4, the internal plate 40 further can have an interference surface 56, and which can also be referred to as an interference element or a blocking member. In the illustrated embodiment of FIG. 4, the interference surface 56 can characterized by two elongate projections 57 separated by a trough 59. By actuation of the biasing handle, the interference surface 56 can be engaged with the upright leg 8 to resist and prevent its movement in the receiving passage 20. While the interference surface 56 as illustrated has two elongate projections 57, another number of projections can be implemented. For example, four elongate projections 57 can be implemented. In yet another example, three elongate projections can be implemented. The number of projections can be based on a desired strength and size requirement. In at least one example, the projections can be variably configured such that the location and number of projections can be varied in dependence upon the cooperation with another component. The manner in which the illustrated interference surface 56 is engaged and released from the upright leg 8 is shown for example in FIGS. 6 and 7. When other types of inference surfaces 56 are implemented, the fit and look would be different.

Figure 6:
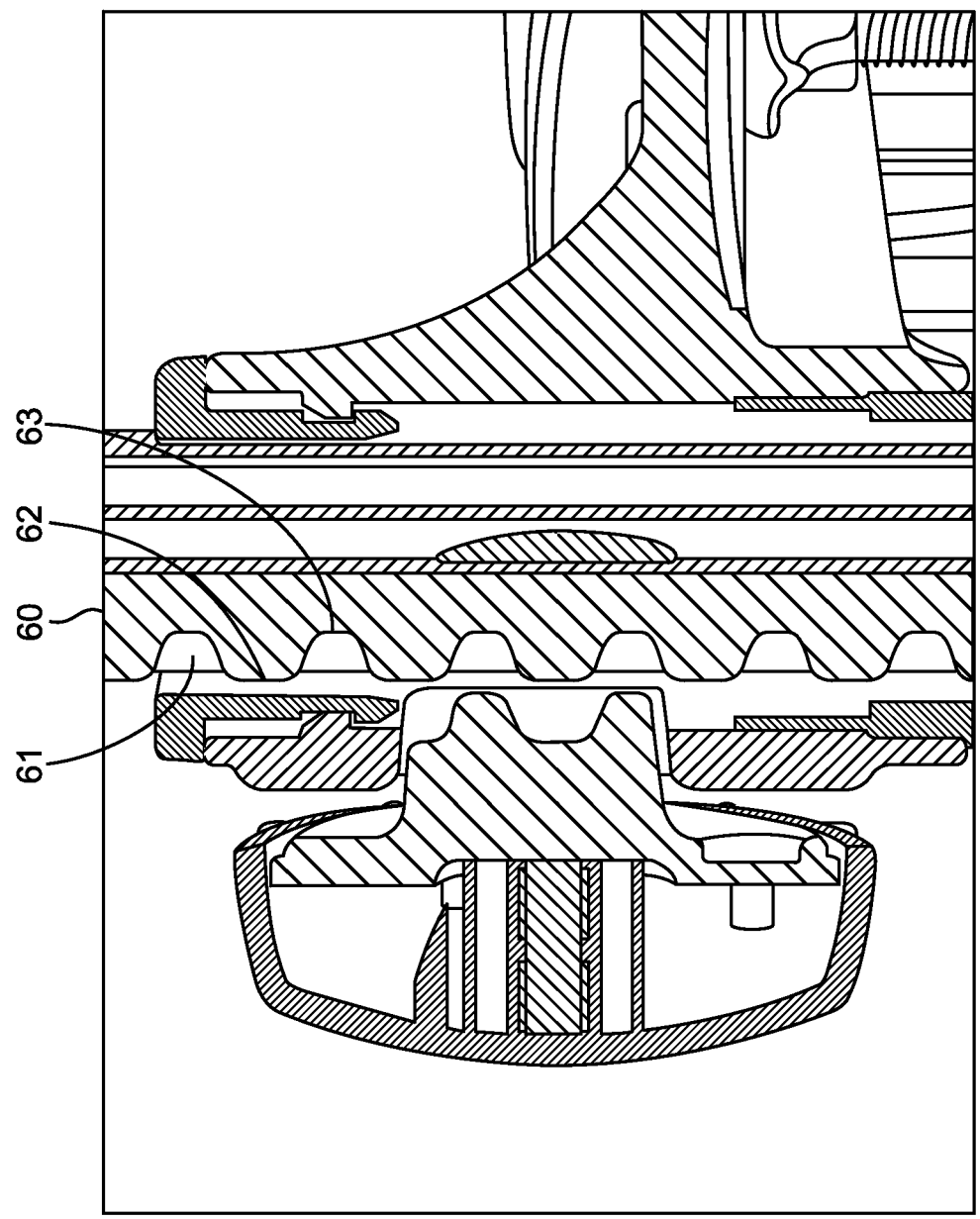
FIG. 6 is an illustration of a cross sectional view of a portion of the base member for a load carrier rack.
Figure 7:
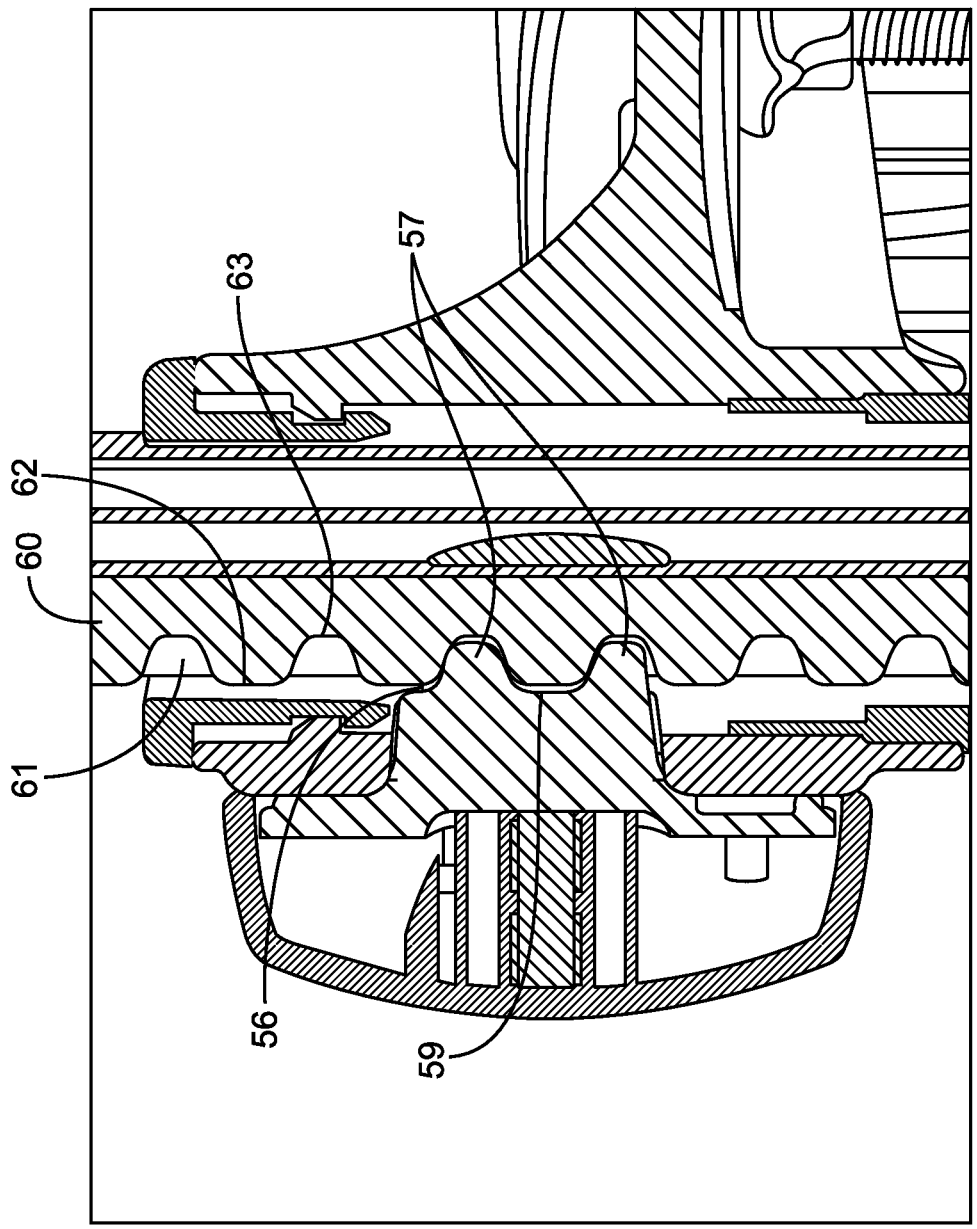
FIG. 7 is an illustration of a cross sectional view of a portion of the base member for a load carrier rack.

As shown in FIG. 6, the upright leg 8 has a bar 60 positioned therein and can have one or more grooves 61. In the illustrated example, a plurality of grooves 61 is provided. In yet another example, the grooves can be arranged in sets of grooves 61. The grooves 61 can have ridges 62 and troughs 63. Further, the biasing handle 31 is depicted in a released configuration. In the released configuration, the interference surface 56 is pulled back away from and disengaged from the upright leg 8. By actuation of the biasing handle 31, the interference surface 56 can move into interfering engagement with the upright leg 8. Accordingly, the biasing handle 31 in the actuated configuration is shown in FIG. 7. In the actuated configuration, the interference surface 56 is engaged against the upright leg 8.

As shown in FIG. 7, when engaged against the upright leg 8, the elongate projections 57 are inserted into the troughs of the bar 60. Moreover, the interference surface 56 and grooves 61 can be reciprocally shaped such that when the interference surface 56 is engaged against the upright leg 8, the elongate projections 57 fit securely between the ridges 62 and into the troughs 63 of the bar 60. Because of this secure fit, the elongate projections 57 interfere with the movement of bar 60, and accordingly also the upright leg 6, thereby mechanically limiting and/or preventing movement of the upright leg 8. In particular, the elongate projections 57 block the ridges 62 from moving and thus resist vertical sliding and movement of the upright leg 8, fixing it firmly in place.

Figure 8:
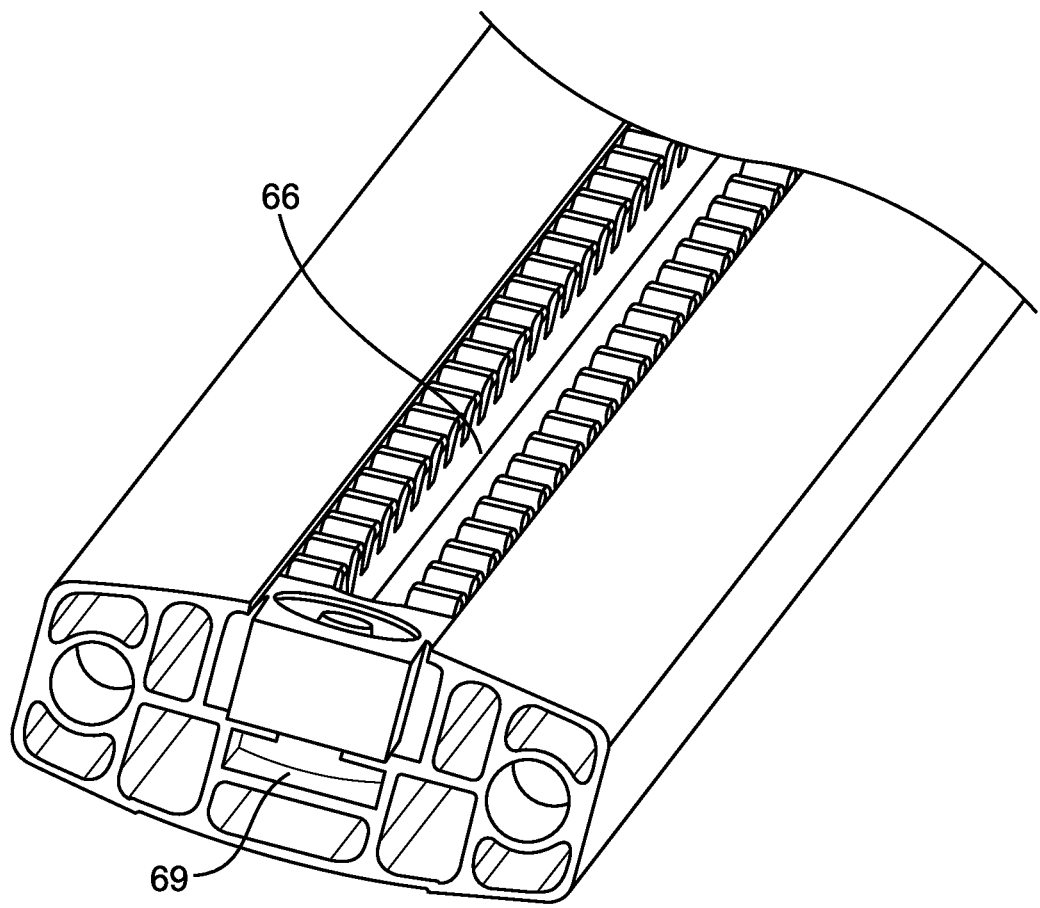
FIG. 8 is an illustration of a perspective view of an upright member.

As can be seen from the movement of the handle between FIG. 6 and FIG. 7, the biasing handle 31 can move concomitantly with the interference surface 56 and a portion of the internal plate 40 can be contained within the biasing handle 31. Referring to FIG. 5, the compression T-bolt 52 passes through the central aperture 55 of the internal plate 40 and can be inserted into the threaded central aperture 51 on the underside of the biasing handle 31. Additionally the compression T-bolt 52 can have shaped portion 65, which is elongate in one direction (shown in FIGS. 3-4). This shaped portion 65 fits within the opening 66 of the bar 60, as can be seen in FIG. 8. Due to the elongate form of the shaped portion 65, the compression T-bolt 52 is prevented from rotating when the biasing handle 31 is rotated. At the same time however, the biasing handle 31 will be drawn toward the upright leg 8.

Additionally, when the biasing handle 31 is rotated, the compression T-bolt 52 is drawn further into the threaded aperture 51. Simultaneously the compression T-bolt 42 is drawn toward the biasing handle 31. The flanged end 54 having the compression surface 67 on the underside thereof, is pulled and compressed against an internal surface 68 of the upright leg 8 on the opposite side of the interference surface. This has the effect of squeezing and locking the upright leg 8, and in particular, the bar 60 contained the upright leg 8 in place between the interference surface 56 and the compression T-bolt 52.

As shown in FIGS. 5-7, the flanged end 54 of the compression T-bolt 52 can be positioned just behind the bar 60, in the elongate internal cavity 69 of the upright member 6. Accordingly the compression surface 55 can be compressed directly against the rear surface 68 of the bar 60 or another internal surface of the upright leg 8.

As described above, the load carrier rack 1 can be configured to be a height adjustable load carrier rack. When the load carrier rack is configured to be a height adjustable load carrier rack, one or more of the upright legs 8 of the load carrier rack 1 can be adjusted relative to the base member 5 such that the height of the upright leg 1 can be changed relative to the base member 5. As described above, the biasing handle 31 can have an actuated and a released configuration in which the upright leg is held in position or free to move, respectively.

As illustrated in FIGS. 9-16, the upright leg 8 can be configured to be variously coupled to the base member 5 at discrete locations 910 along a length L of the upright leg 8. The number of discrete locations 910 can be determined based on the number of vehicles upon which the upright leg 8 and base member 5 are designed to be mounted. For example, if a universal pair of upright leg 8 and base member 5 is desired, the number of discrete locations 910 can be greater as compared to a configuration of an upright leg 8 and base member for fewer vehicles. Additionally, when a large number of discrete locations 910 are included, the adjustable load carrier rack 1 can be positioned above, level, and below the cab of the vehicle. In some embodiments, the adjustable load carrier rack 1 can be implemented on a vehicle without a cab such as a utility trailer.

Figure 9:
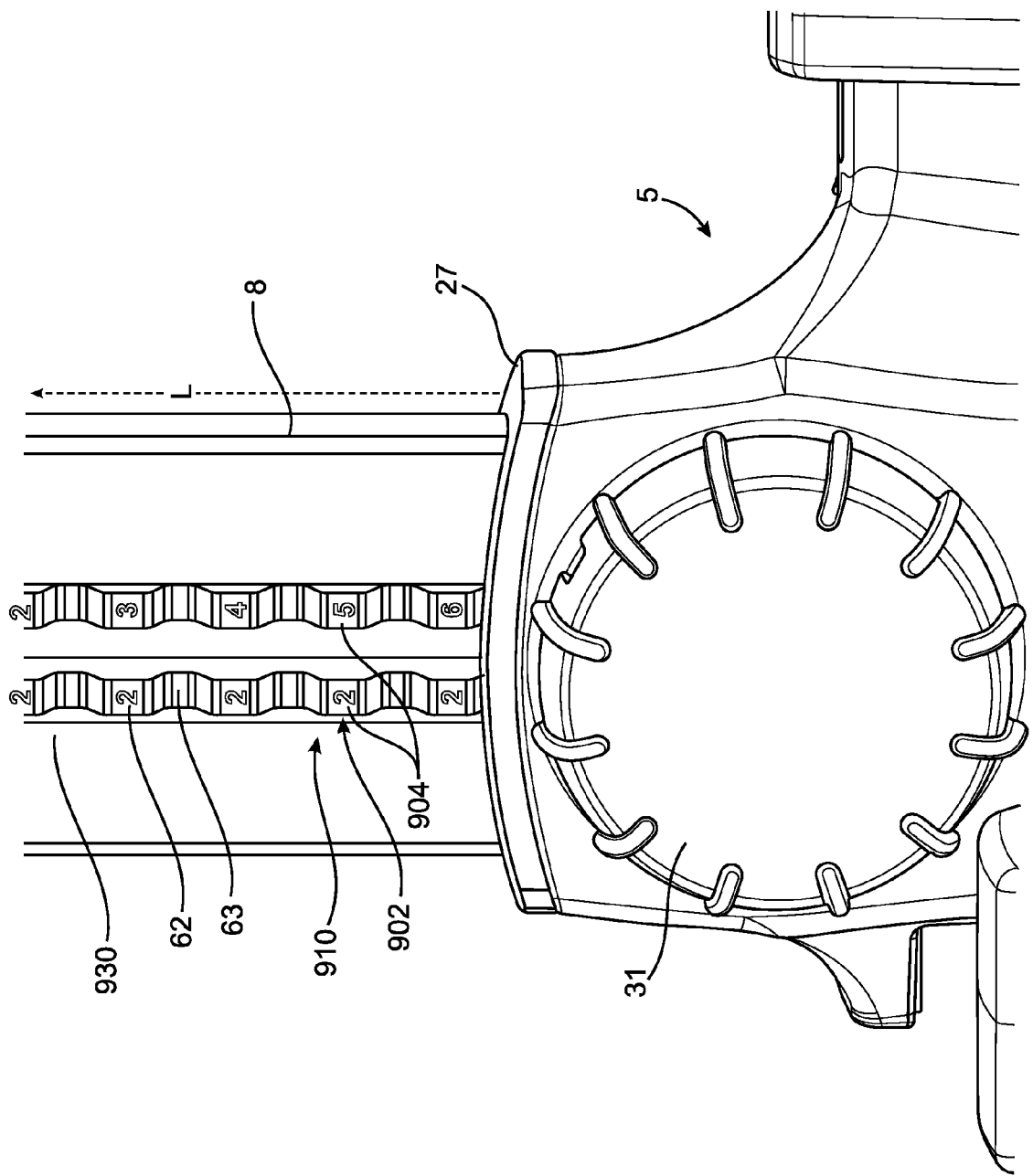
FIG. 9 is an illustration of a partial view of a load carrier rack in accordance with an example implementation of the present disclosure, illustrating a demarcated portion of an upright leg of the load carrier rack.

As illustrated in FIG. 9, the upright leg 8 can also include a demarcated portion 902. The demarcated portion 902 can include a plurality of position labels 904. Each of the plurality of position labels 904 can signify individual ones of a plurality of discrete position settings of the upright leg 8 relative to the base member 5. The base member 5 can be configured to alternately engage with each of the plurality of discrete locations 910 along the length L of the upright leg 8. When the base member 5 engages with one of the plurality of discrete locations 910, the height-setting of the load carrier rack is fixed in dependence upon user-selection among the position labels 904 of the demarcated portion 902 of the upright leg 8. In FIG. 9, the discrete position setting corresponds not with the position label that is directly associated with the position setting, but it is longitudinally offset. The biasing handle 31 engages the upright leg 8 at a portion that is below the respective label. The user can be informed of a corresponding discrete position setting by the position labels 904. The position labels 904 that are directly above cap attachment 27 corresponds to the engaged discrete position setting. In other examples, the position labels 904 can correspond in other ways. As illustrated, the position label 904 "26" denotes discrete position setting that the biasing handle 31 is engaged with.

As shown, the position label 904 is numeric. In other examples, the position label 904 can be alphabetic. In yet another example, the position label 904 can be alphanumeric so that it includes both letters and numbers. In other examples, other symbols or even words can be used. For example, the position label 904 can indicate a particular make and model of a pickup truck. In other examples, the position label 904 can indicate the general size of the pickup truck for example, full size, mid-size, or compact.

While the present disclosure can be implemented with a single base member 5 and corresponding upright leg 8, it is also within the scope of this disclosure that a plurality of base members 5 and corresponding upright legs 8 can be implemented. For example, a plurality of base members 5 can be each mountable on a vehicle. Additionally, a plurality of upright legs 8 can be configured to be variously coupled, one each to a respective one of the plurality of base members 5, at discrete locations 910 along a length L of the respective upright leg 8. In one example, such as the one provided in FIGS. 1 and 2, four base members 5 and four respective upright legs 8 can be implemented. In yet another example, two base members 5 and two respective upright legs 8 can be implemented.

Figure 10:
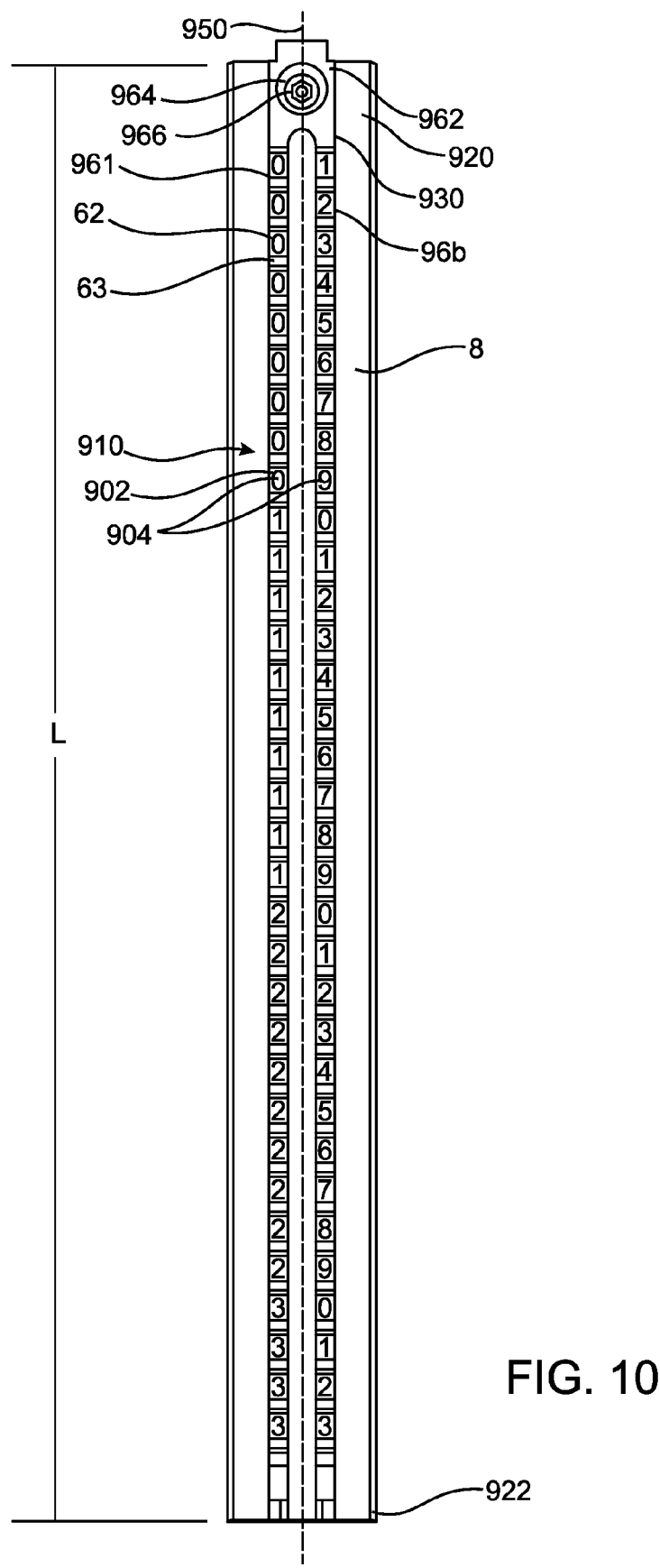
FIG. 10 is an illustration of a front view of an upright leg of a load carrier rack in accordance with an example implementation of the present disclosure.

FIG. 10 illustrates an upright leg 8 having a demarcated portion 902 according to the present disclosure. The demarcated portion 902 has a plurality of position labels 904 which can be arranged as discussed above. The upright leg 8 can have a top end 920. The demarcated portion 902 of the upright leg 8 can be similarly positioned with respect to the top end 920 of the upright leg 8. When a plurality of upright legs 8 are implemented, the associated discrete position settings of each upright leg 8 can be substantially the same so that when arranging the upright legs 8 in the respective base members 5, the upright legs 8 extend the same distance therefrom. In this implementation, each top end 920 of the upright leg 8 is configured to engage with an upper support 6 at substantially the same distance from the vehicle. In some instances, users may desire to set the upright legs 8 at different heights from the vehicle such that the upright legs 8 closest to the vehicle cab are higher than the upright legs 8 closest to the tailgate of the vehicle.

As illustrated in FIG. 10, the position labels 904 are numeric labels shown in an increasing order from the top end 920 of the upright leg 8 to the bottom end 922 of the upright leg. When the numeric labels are shown in the increasing order, it is possible to have the position labels 904 reflect the distance the top end 920 is above the base member (not illustrated). In the illustrated example, when a user wishes to adjust the upright legs 8 to be the same height from the vehicle, the user can align one of the upright legs 8 near the cab portion to the desired height and then make the rest of the upright legs 8 the same height by setting the length of the upright legs 8 based on the position labels 904 (see example in FIG. 9).

FIG. 10 further illustrates the longitudinal axis 950 of the demarcated portion 902. The upright leg 8 has a length L. The length of the upright leg 8 can be selected in dependence upon the vehicles that the upright leg 8 is designed to cooperate therewith. The demarcated portion 902 can include a left side portion 961 and a right side portion 963. The left side portion 961 and right side portion 963 can be joined by joining portion 962. In other implementations, demarcated portion 902 can be a single piece along its entire length.

As illustrated, the plurality of discrete locations 910 along the length L of the upright leg 8 which the base member 5 alternately engages are formed by a series of alternating troughs 63 and ridges 62. While the illustrated embodiment includes troughs 63 and ridges 62, other implementations can have other features which allow for variable engagement therewith. For example, pegs and holes can be implemented. In yet another example, slots can be implemented with corresponding engagement surfaces.

Additionally, the series of alternating troughs 63 and ridges 62 that form the plurality of discrete locations 910 along the length L of the upright leg 8 can be formed in a strip 930 of material that can be releasably coupled to the upright leg 8. As illustrated, the strip 930 is releasably coupled to the upright leg 8 via a fastener. The fastener as illustrated in FIG. 10 is a nut 966. The nut 966 is located within a recess 964 formed in the top portion of the demarcated portion 902. While the illustrated implementation of the demarcated portion 902 is releasably coupled, other implementations can be coupled or attached to the upright leg 8. The coupling of the demarcated portion 902 can be through a friction fit such that once the demarcated portion 902 is installed, it is difficult to remove the demarcated portion. The attachment can be a permanent or semi-permanent attachment such that the removal thereof is difficult or impossible without destroying upright leg 8.

Figure 11:
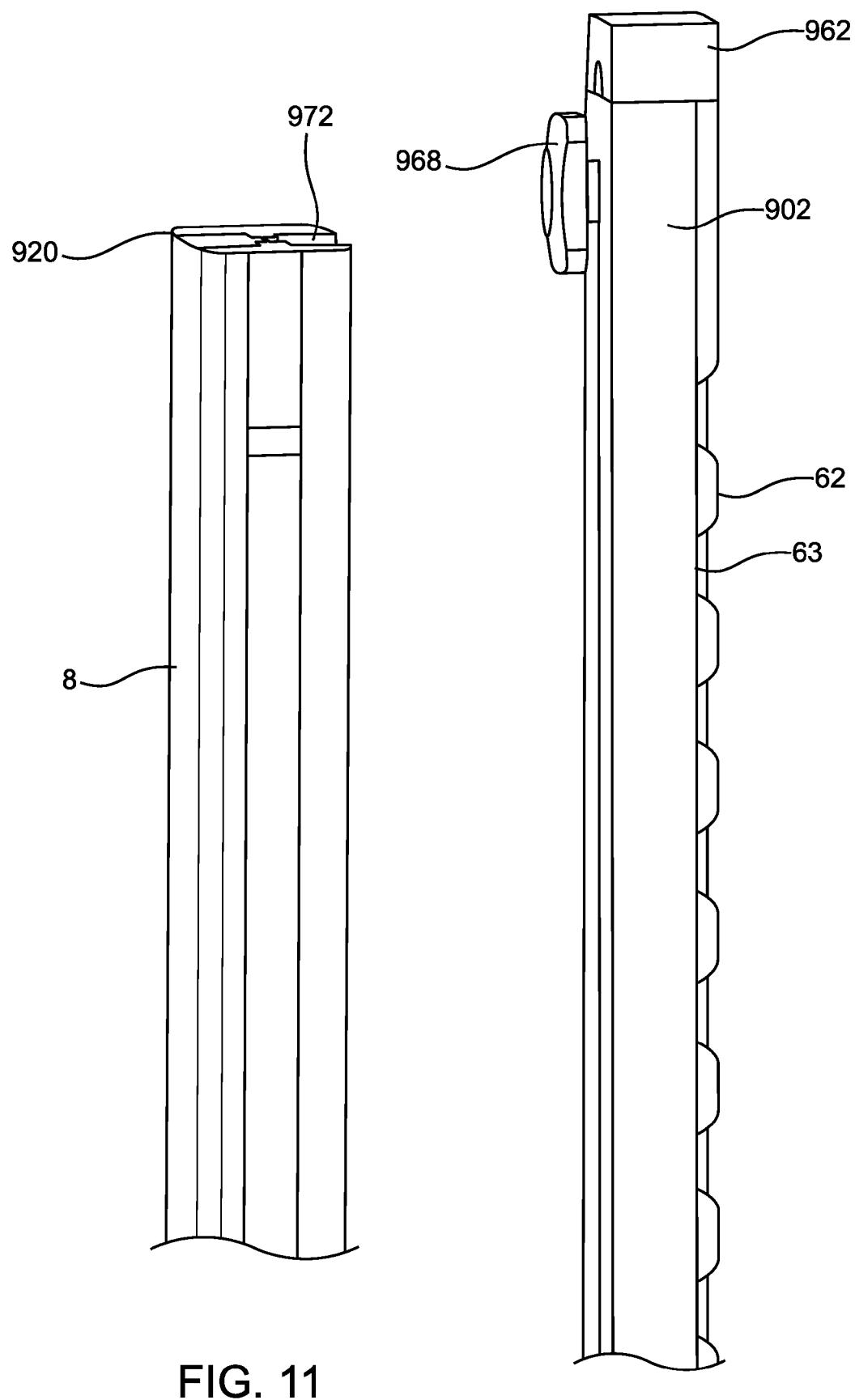
FIG. 11 is an illustration of a side perspective view of an upright leg of a load carrier rack having a demarcated portion in accordance with an example implementation of the present disclosure, illustrating the releasable coupling of the upright leg and the demarcated portion.

In order to further illustrate the releasable coupling as providing in FIG. 10, FIGS. 11-13 are provided. As illustrated in FIG. 11, the top portion of the demarcated portion 902 has an upright leg engagement fastener 968 protruding from the rear thereof. The upright leg engagement fastener 968 is configured to fit within a receiving opening 972 formed in the top end 920 of the upright leg 8. The upright engagement fastener 968 is then positioned within the upright leg 8 and releasably coupled thereto. When a releasable coupling of the demarcated portion 902 is made, it allows for removal of the demarcated portion 902 should it become damaged due to wear and tear or accidental damage. Since the demarcated portion 902 provides for engagement with the base portion 5 (not shown), it is important to maintain the integrity thereof. The demarcated portion 902 can have other portions which allow it to be fixed within the upright leg 8 such as side portions that provide for a snug fit.

Figure 12:
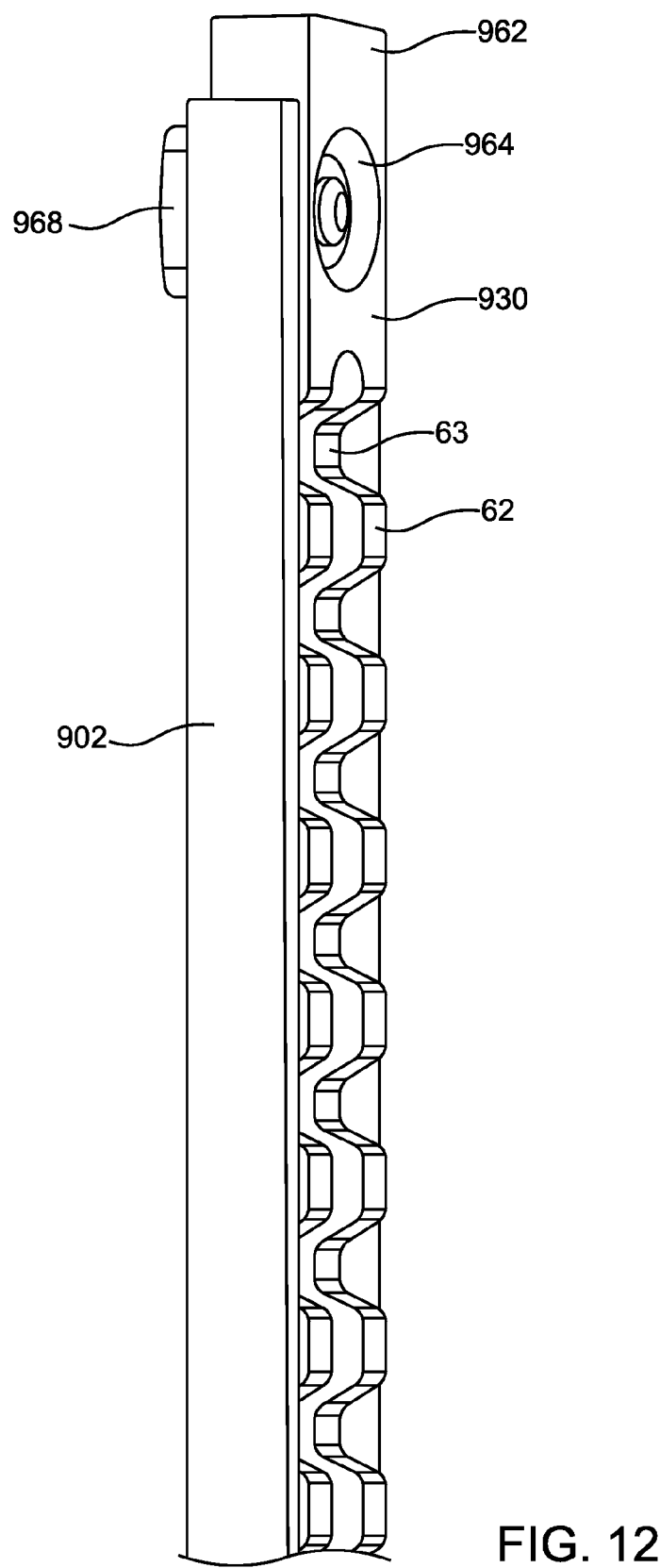
FIG. 12 is an illustration of a side perspective view a demarcated portion of an upright leg in accordance with an example implementation of the present disclosure.

FIG. 12 illustrates a perspective view of the demarcated portion 902 including the upright engagement fastener 968. As seen, the demarcated portion 902 includes a plurality of troughs 63 and ridges 62. The fastener 968 goes through the demarcated portion 902 and is within a recess 964.

Figure 13:
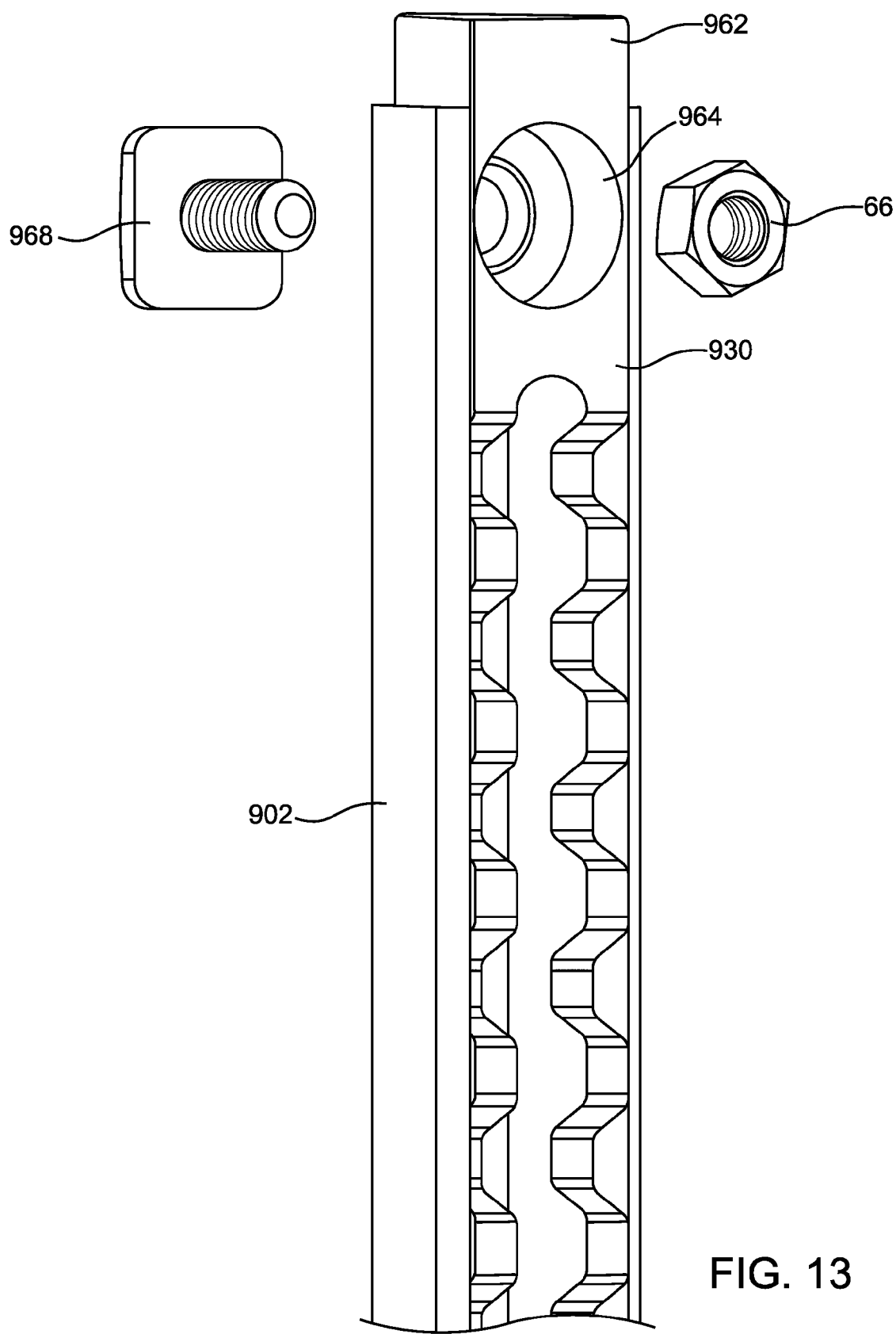
FIG. 13 is an illustration of a perspective view of the demarcated portion including the upright engagement fastener in accordance with an example implementation of the present disclosure.

FIG. 13 illustrates yet another perspective view of the demarcated portion 902 and the upright engagement fastener 968 and nut 66 in an assembly view. As shown, the upright engagement fastener 968 has a threaded connection for coupling with the nut 66.

Figure 14:
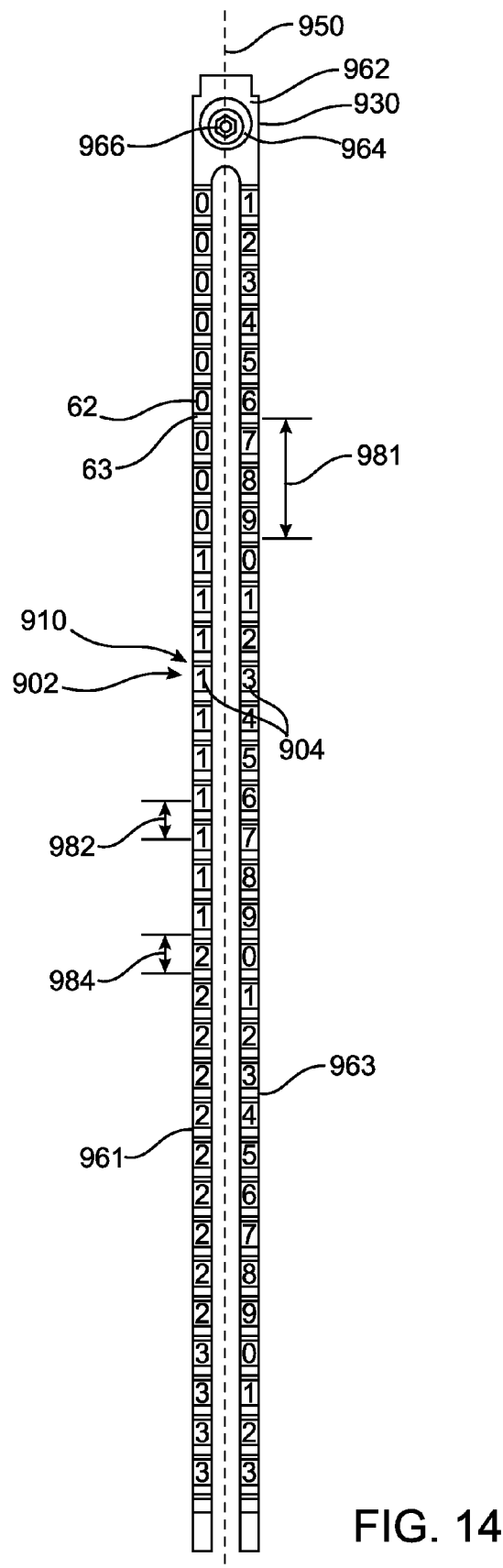
FIG. 14 is an illustration of a front view of a demarcated portion of an upright leg in accordance with an example implementation of the present disclosure.
Figure 15:
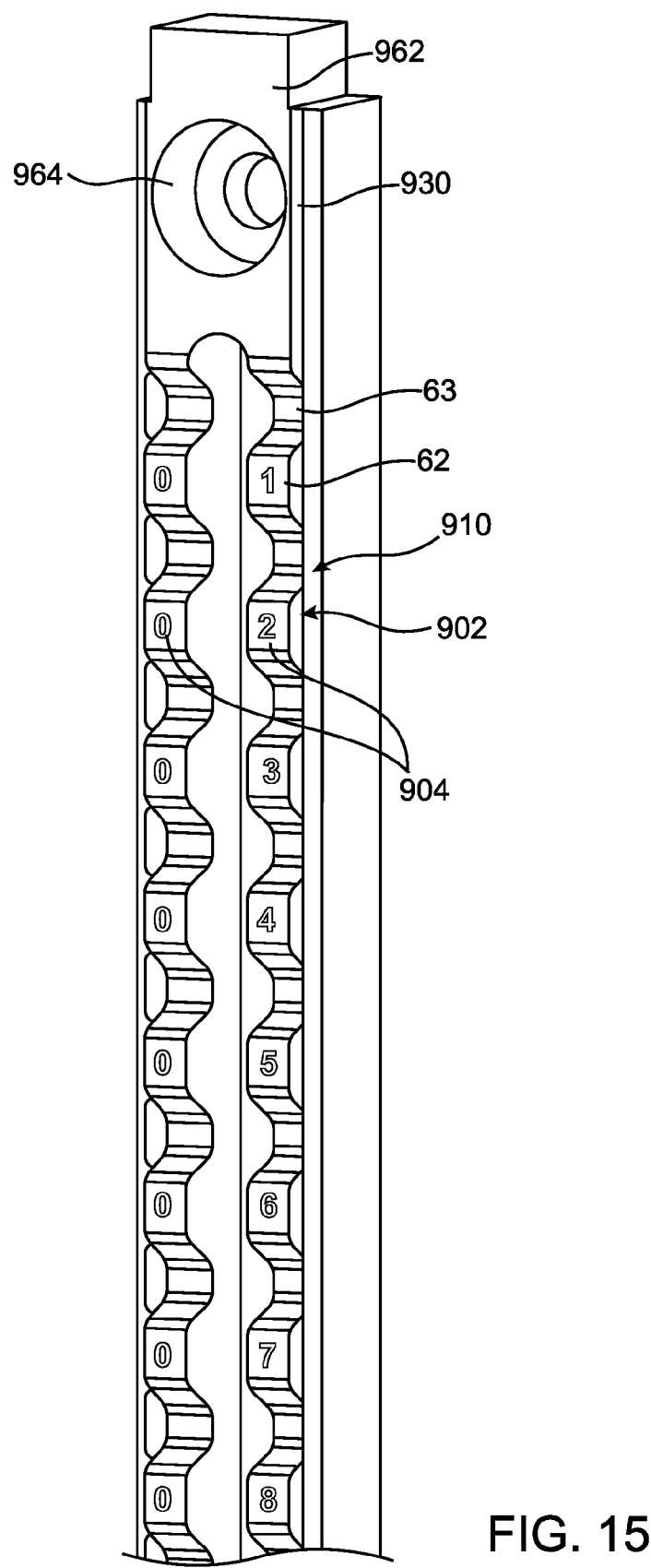
FIG. 15 is an illustration of a perspective view of the demarcated portion including the upright engagement fastener in accordance with an example implementation of the present disclosure, illustrating the position labels of the demarcated portion.
Figure 16:
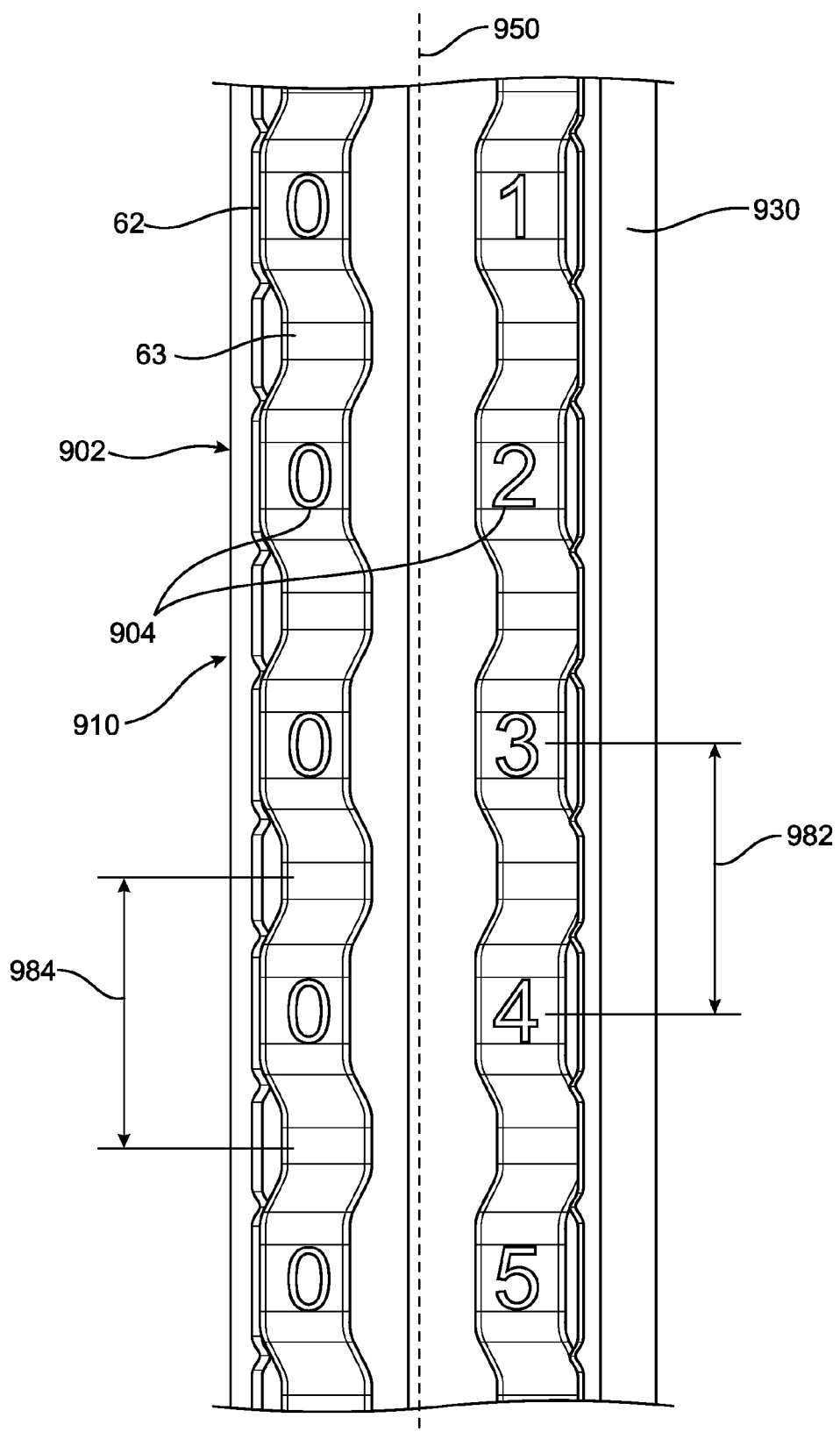
FIG. 16 is an illustration of a close-up perspective view of the demarcated portion illustrated in FIG. 15.

FIGS. 14-16 illustrate additional views of the demarcated portion 902. The demarcated portion 902 as illustrated in FIG. 14 has a center line 950, a left side portion 961, a right side portion, ridges 62, and troughs 63. Additionally, a plurality of position labels 904 is provided signifying individual ones of a plurality of discrete position settings 910. As indicated above, the discrete position setting 910 can be offset from the associated position label 904. For example, the plurality of demarcated position labels 904 can be offset from any one of the troughs 63 of the series of alternating troughs 63 and ridges 62 relative to a longitudinal axis 950 by an offset distance 981. This offset distance 981 can be based on the dimension of the base member 5 and the position label 904 that would be visible. While in the embodiment illustrated in FIG. 9, the position label 904 is visible above the base member 5, the position label 904 could be configured to be visible on the side of the base member 5. In one example, the position label 904 could be configured to be visible through a clear viewing window provided in the base member 5. In such an implementation the position label 904 can be selected based on whether the position label 904 is visible in the viewing window.

The position labels 904 can be printed on the strip 930 of material coupled to the upright leg 8 on which the series of alternating troughs 63 and ridges 62 are formed. In other embodiments, the plurality of demarcated position labels 904 can alternatively be embossed upon the strip 930 of material. In yet another example, the plurality of demarcated position labels 904 can be debossed into the strip 930 of material. In other implementations, the position labels 904 can be provided on the upright leg 8 itself. When provided separately, aligning of the demarcated position labels 904 and associated discrete position setting is important.

Furthermore as illustrated in FIG. 14, the plurality demarcated position labels 904 are arranged in a consecutive series spaced part at the same distance as the spacing between a consecutive series of troughs 63 of the series of alternating troughs 63 and ridges 62. For example, the troughs 63 are spaced apart from one another by a trough distance 984. Additionally, the ridges 62 are spaced apart from one another by a ridge distance 982. The ridge distance 982 and the trough distance 984 can be the same distance as illustrated. In the illustrated example, the demarcated position labels 904 are positioned on the ridges 62 and thus are spaced apart the same distance as the troughs 63 and ridges 62. In this example, an increase in precision of labeling can be achieved along with reduced cost in placement of labels as they are directly labeled on the demarcated portion itself. The demarcated labels 904 can be presented by any one of the above described techniques.

In at least one implementation, each of the plurality of demarcated position labels 904 can be positioned parallel to respective ones of the troughs 63 of the series of alternating troughs 63 and ridges 62 relative to a longitudinal axis 950 of the strip 930 of material comprising the labels 904 and troughs 63.

In at least one implementation, the upright legs 8 can be predominantly constructed from metal, and the strip 930 of material comprising the demarcated position labels 904 and troughs 63 can be predominantly constructed from plastic. In other implementations, the upright legs 8 and strip 930 of material can be constructed from the same material for example a metal.

FIGS. 15 and 16 illustrate close up views of the demarcated portion 902. As seen in the illustrations the demarcated position labels 904 are located on the ridges 62 which are adjacent to troughs 63. Additionally, the plurality of demarcated position labels 904 are arranged in a consecutive series spaced part at the same distance as the spacing between a consecutive series of troughs 63 of the series of alternating troughs 63 and ridges 62. For example, the troughs 63 are spaced apart from one another by a trough distance 984 (shown in FIG. 16). Additionally, the ridges 62 are spaced apart from one another by a ridge distance 982. The ridge distance 982 and the trough distance 984 can be the same distance as illustrated. In the illustrated example, the demarcated position labels 904 are positioned on the ridges 62 and thus are spaced apart the same distance as the troughs 63 and ridges 62.

FIGS. 17-21 illustrate a removable blocking device 1000 for preventing disengagement of an upright leg 8 of a vehicular mounted load carrier 1 from a base member 5 of the load carrier 1. (See FIGS. 1-3 illustrating the implementation of the base member 5 and upright leg 8). The removable blocking device 1000 can be implemented to more securely fasten the load carrier to the vehicle to prevent theft of the load carrier. The removable blocking device 1000 can be implemented with other implementations of components as described herein.

As described above, the base member 5 has a receiving passage formed there-through and in which the upright leg 8 can reciprocate upwardly and downwardly. The removable blocking device 1000 when installed and locked in place limits the reciprocation of the upright leg 8 when the removable blocking device 1000 abuts against the base member 5 proximate to a lower opening 21 to the receiving passage 20. In the illustrated example, the removable blocking device 1000 is configured to only limit the motion of the upright leg 8 when in a locked configuration. In other implementations, the removable blocking device 1000 can have a snug friction or otherwise firmly retained configuration as well in which it resists motion of the upright leg 8.

Figure 17:
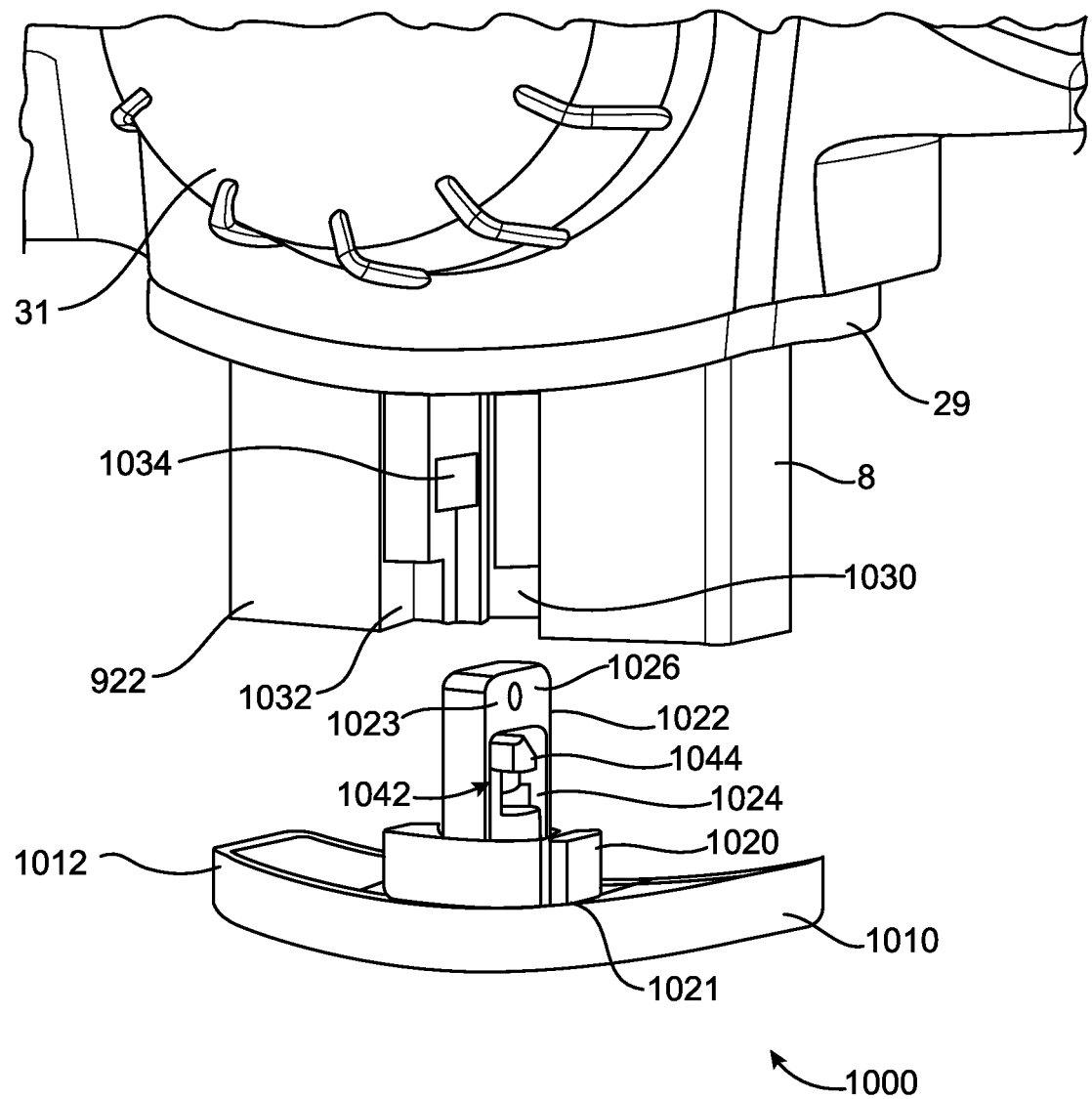
FIG. 17 is an illustration of a removable blocking device decoupled from a base member of a load carrier rack in accordance with an example implementation of the present disclosure.

As illustrated in FIG. 17, an interference portion 1010 can be releasably couplable to a lower distal end 922 of the upright leg 8. The interference portion 1010 can have a dimension that is greater than a corresponding dimension of the lower opening 21 to the receiving passage 20 through the base member 5. The interference portion 1010 can have an abutment surface 1012 configured to blockingly engage the base member 5 proximate the lower opening 21 to the receiving passage 20. Additionally, in at least one implementation, a lock 1040 can be contained at least partially within the removable blocking device 1000, the lock 1040 being transitional between a locked configuration in which the removable blocking device 1000 is locked to the upright leg 8 and an unlocked configuration in which the removable blocking device 1000 is released from the upright leg 8.

As illustrated the lower distal end 922 of the upright leg can have special surfaces formed therein to accommodate the interference portion 1010. Specifically, in at least one implementation, the removable blocking device can include an insert portion 1022 configured to be received in an opening 1030 in the upright leg 8 and to be releasably secured therein. The interference portion 1010 can be coupled to a lower distal end 1021 of the insert portion 1022. Furthermore, the lock 1040 can be contained at least partially within the insert portion 1022. In other implementations, the lock 1040 can be located in another portion of the removable blocking device 1000 or the lock can be located externally to the removable blocking device 1000, but allows for the removable blocking device 1000 to be locked to the upright leg 8. As indicated above, the removable blocking device 1000 can also be configured to have a snug, snap or other fit that allows for the removable blocking device 100 to be retained in the upright leg 8 without the lock being in the locked configuration. Additionally, in other implementations, the removable blocking device 1000 can be mounted solely externally to the upright leg 8 such that no portion of the removable blocking device 1000 is within the upright leg 8.

The insert portion 1022 can be co-molded together with the interference portion 1010. In other implementations, the insert portion 1022 can be releasably coupled to the interference portion 1010. In yet another implementation, the lock 1040 can be configured to secure the insert portion 1022 to the interference portion 1010. As illustrated, the insert portion 1022 can include a bottom portion 1020 which is wider than a top portion 1026 thereof. The bottom portion 1020 can adjoin the interference portion 1010. The opening 1030 can be configured to receive the different shapes and sizes of the top portion 1026 and bottom portion 1020 of the insert portion 1022. For example, the opening 1030 can have shoulder areas 1032 formed therein for receiving the wider bottom portion 1020. Furthermore, the top portion 1026 can include two side walls 1023 through which a pair of openings 1024 are formed. Each of the pair of openings 1024 can be sized to permit a portion 1044 of the lock 1040 to extend there-though and engage corresponding lock receiving portions 1034 of the upright leg 8. The portion 1044 of the lock 1040 can be mounted on a securement portion 1042 of the lock that extends from the rotatory portion of the lock and is configured to be adaptable to a variety of different locking requirements. In the illustrated implementation, the portion 1044 is in the form of a tab.

Figure 18:
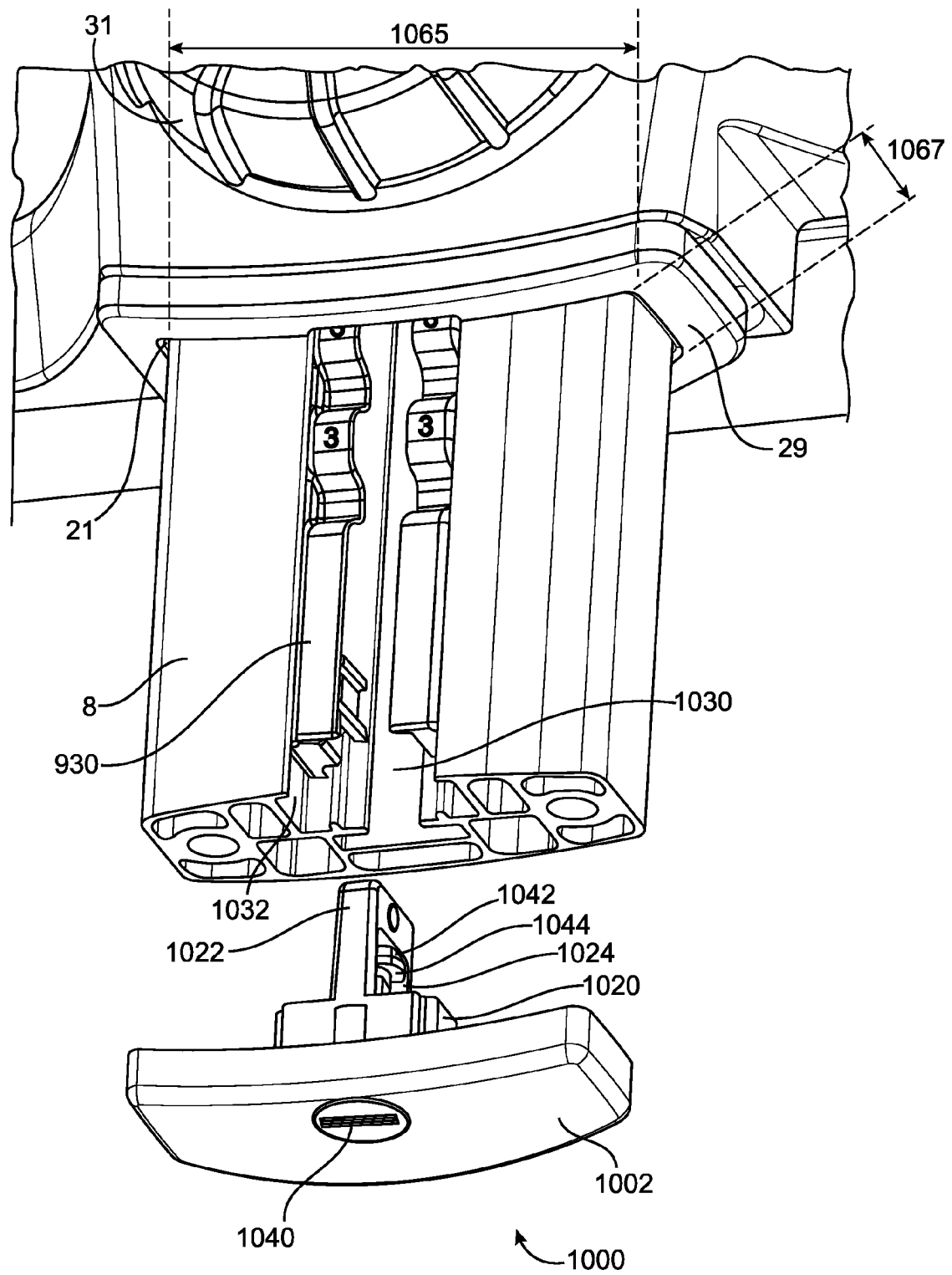
FIG. 18 is an illustration of a bottom perspective view of the removable blocking device illustrated in FIG. 17.

FIG. 18 illustrates a bottom perspective view of the removable blocking device 1000 and the upright leg 8. As seen from the perspective view, the upright leg 8 can have a structure to provide various shapes internal thereto. In at least one implementation, the upright leg 8 can be extruded. When the upright leg 8 is extruded, other components can be inserted therein to provide for a more snug or friction type fit. For example in the opening 1030, the demarcated portion strip 930 as described above has been inserted. When the insert portion 1022 is included, the insert portion 1022 can extend into the opening 1030 and at least partially abut the strip 930. The strip 930 in cooperation with opening 1030 can form the shoulder areas 1032. In this view the lock 1040 is visible as well as a bottom surface of the interference portion 1010.

FIG. 18 also illustrates the dimensions of the opening 21 in the base member 5. The opening 21 is flanked by lower undercap 29. The lower undercap 29 as described above provides for a closer fit to the upright leg 8. The opening 21 has a long dimension 1065 and a short dimension 1067. As illustrated, the long dimension 1065 is the length and the short dimension 1067 is the width. In other implementations the long dimension 1065 and the short dimension 1067 can be substantially the same.

Figure 19:
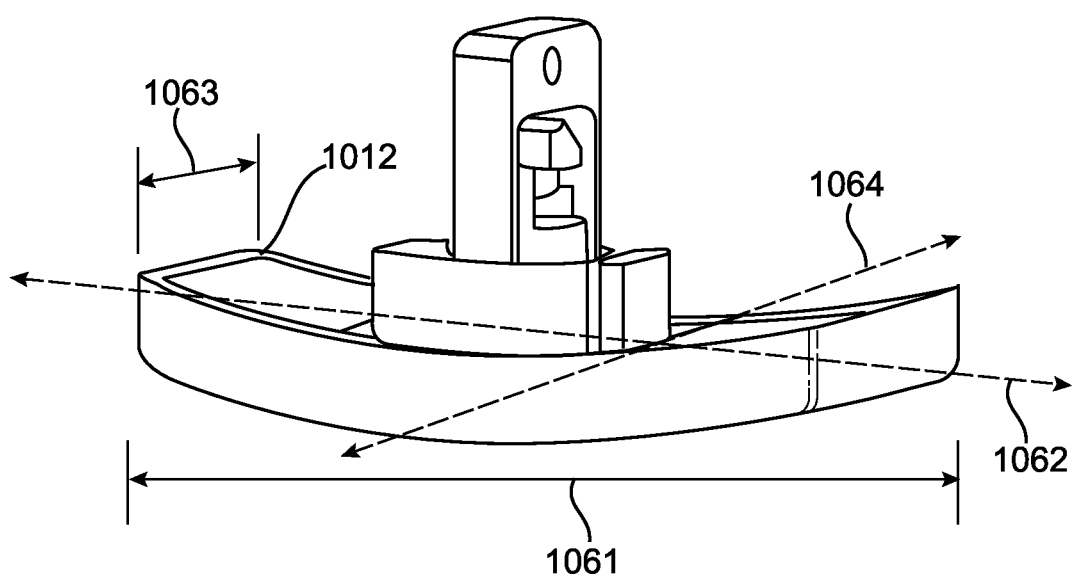
FIG. 19 is an illustration of a perspective view of illustrates a removable blocking device for base member of a load carrier rack in accordance with an example implementation of the present disclosure.

FIG. 19 illustrates the dimensions of the interference portion 1010. As illustrated, the interference portion 1010 has a long axis 1062 and a short axis 1064 respectively corresponding to the long dimension and short dimension of the interference portion 1010. Thus, the interference portion has a length 1061 and a width 1063 along the long axis 1062 and short axis 1064, respectively. In at least one implementation, the length 1061 is greater than the long dimension 1065. In another implementation, the width 1063 is greater than the short dimension 1065. In some implementations, the entire length 1061 is greater than the long dimension 1065, and in other implementations only a portion of the length 1061 is greater than the long dimension 1065. In some implementations, the entire width 1063 is greater than the short dimension 1067, and in other implementations only a portion of the width 1063 is greater than the short dimension 1067. In one implementation, the length 1061 of the interference portion 1010 in the direction of the long axis 1062 is greater than a corresponding length 1065 of the lower opening 21 to the receiving passage 20. In another implementation, a width 1063 of the interference portion 1010 in the direction of the short axis 1064 is greater than a corresponding width 1065 of the lower opening 21 to the receiving passage 20. In yet another implementation, both a length 1061 of the interference portion 1010 in the direction of the long axis 1062 is greater than a corresponding length 1065 of the lower opening 21 to the receiving passage 20 and a width 1063 of the interference portion 1010 in the direction of the short axis 1064 is greater than a corresponding width 1065 of the lower opening 21 to the receiving passage 20. In still another embodiment, the abutment surface 1012 of the interference portion 1010 is a perimeter about the interference portion 1010 and the perimeter about the interference portion 1010 can be greater than a perimeter about the lower opening 21. In these examples, a dimension of the interference portion 1010 prevents it from passing through the opening 21. Other implementations that prevent the interference portion 1010 from passing through the opening 21 are considered within the scope of this disclosure.

Figure 20:
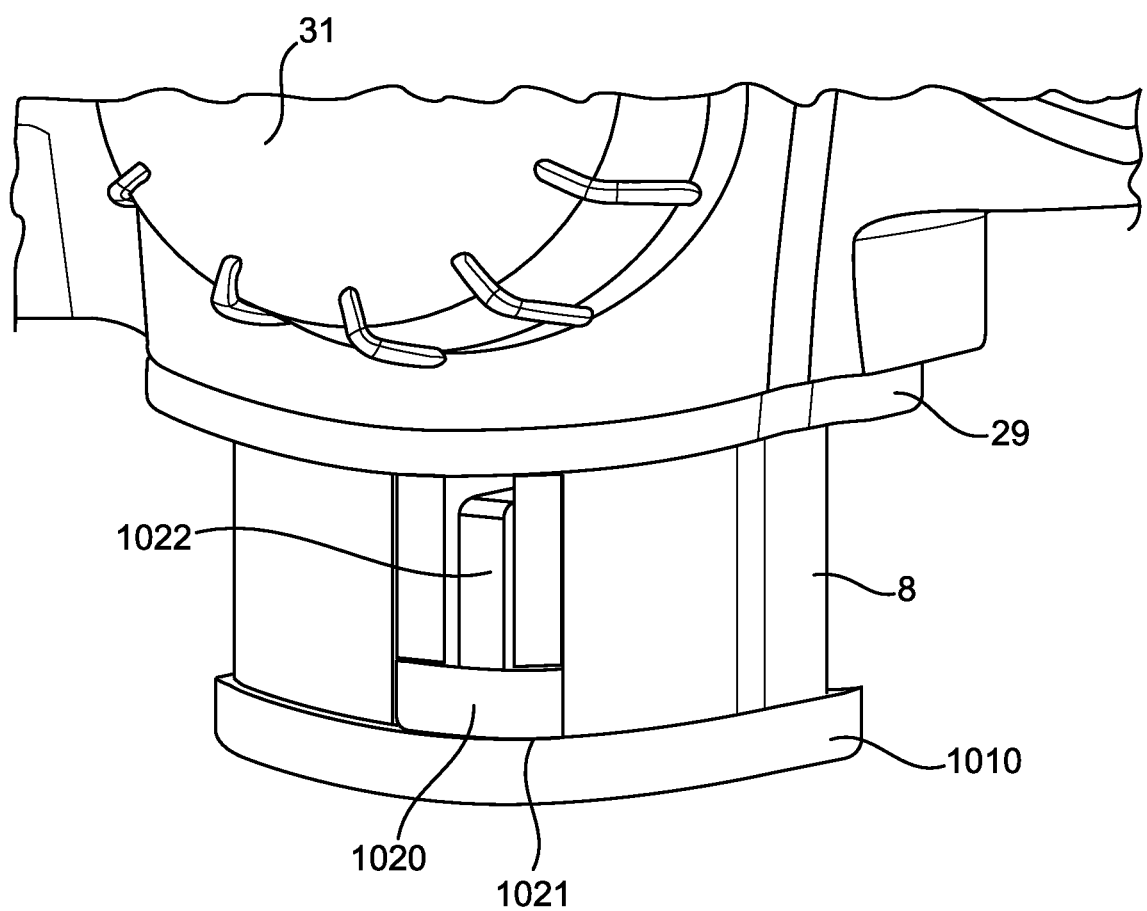
FIG. 20 is an illustration of a perspective view of a removable blocking device assembled to a base member of a load carrier rack in accordance with an example implementation of the present disclosure.

FIG. 20 illustrates the interference portion 1010 in a locked configuration relative to the upright leg 8. The interference portion 1010 is held in place by the lock.

Figure 21:
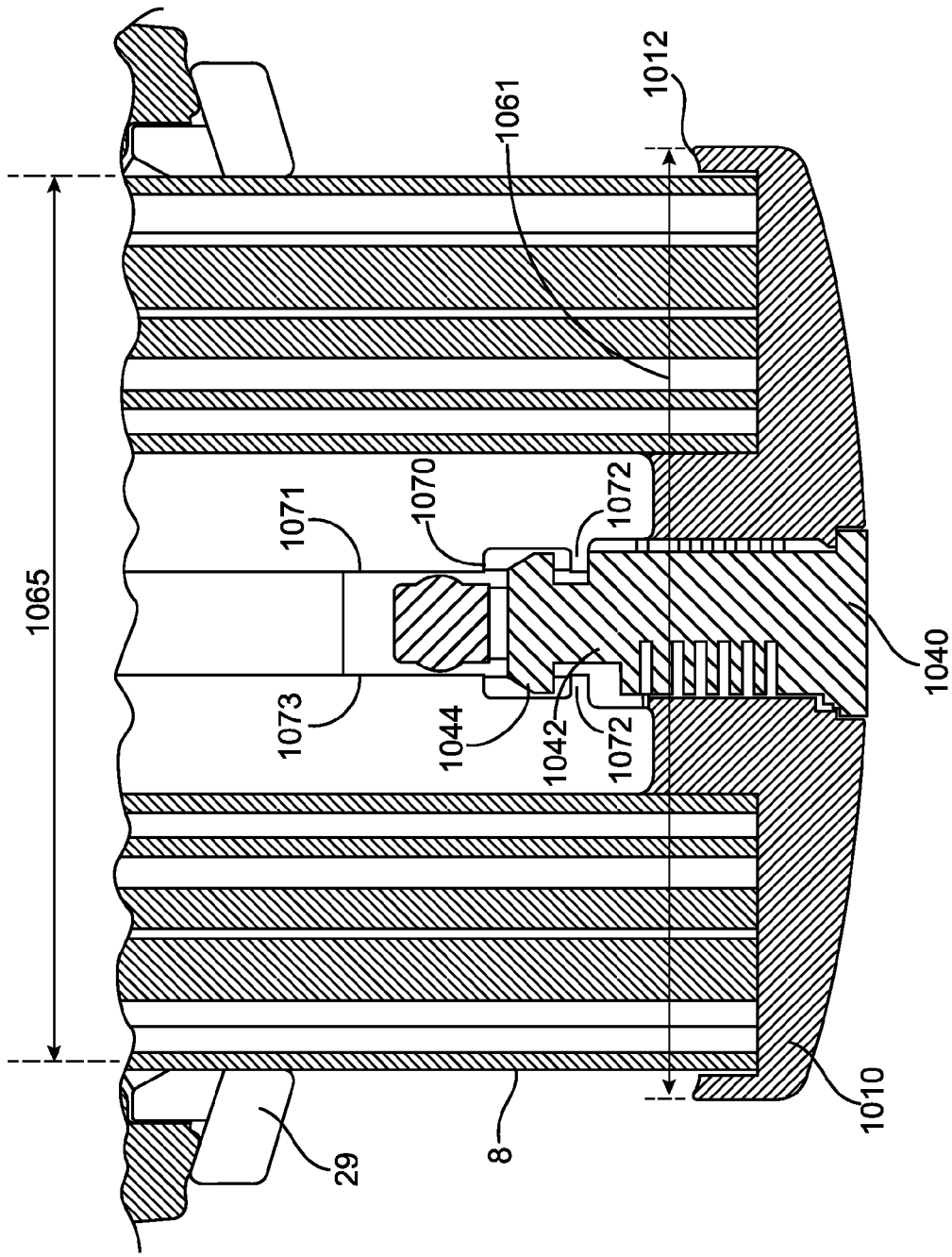
FIG. 21 is an illustration of a cross-sectional view of a removable blocking device assembled to a base member of a load carrier rack in accordance with an example implementation of the present disclosure.

FIG. 21 illustrates a section view of one illustrative implementation of the removable blocking device 1000 in a locked configuration. As illustrated the opening 21 has a long dimension 1065 and the interference portion has a length 1061. As seen, the length 1061 is greater than the long dimension 1065. Additionally, a lock retention opening 1070 can be formed in one end of the upright leg 8. Furthermore, lock retention tabs 1072 can be formed on at least two sides 1071, 1073 of the lock retention opening, wherein the lock retention tabs 1072 prevent removal of the lock 1040 in the locked configuration. In other implementations, other lock retention members can be used to allow the lock to be retained therein. In other implementations, the lock can be implemented externally to the upright leg 8.

Examples of locking covers in accordance with the present disclosure will now be described in relation to FIGS. 22-32.

Figure 22:
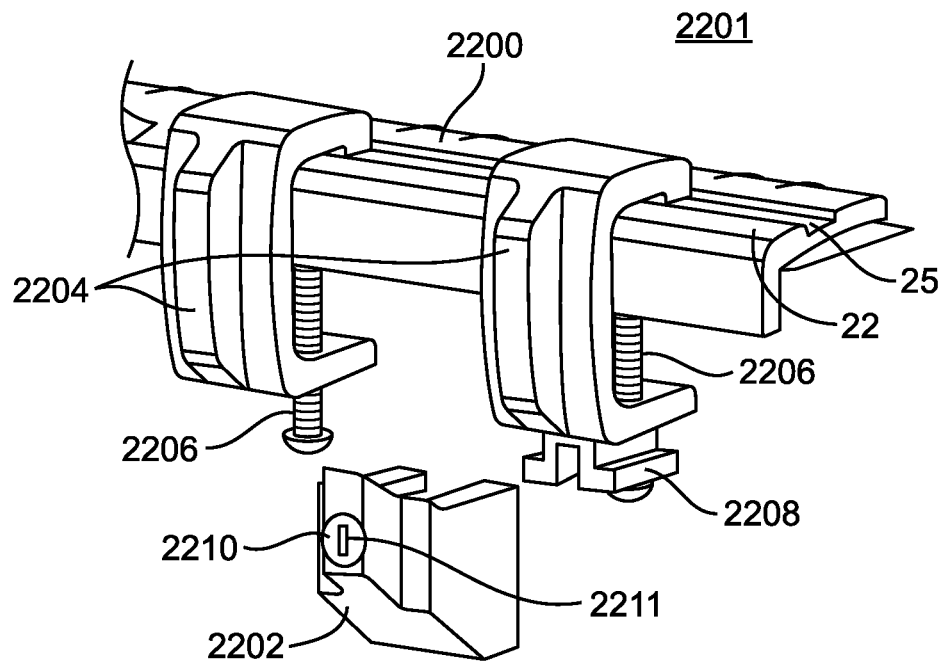
FIG. 22 is an illustration of a locking cover, in accordance with an example implementation of the present disclosure, in an uninstalled and unlocked position where the locking cover is detached from a clamp device clamped to a vehicle rail.
Figure 23:
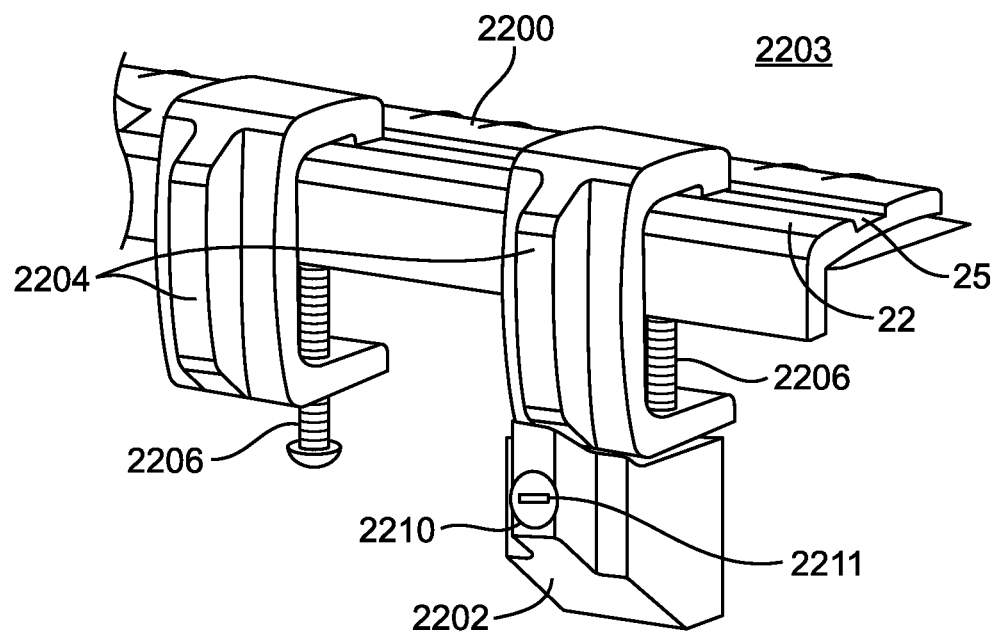
FIG. 23 is an illustration of the locking cover illustrated in FIG. 22 in an installed and locked position.

FIGS. 22 and 23 illustrate an example locking cover for shrouding an operator-engageable portion of the clamp device from unauthorized access in the installed and locked position. FIG. 22 illustrates the locking cover 2202 in an uninstalled unlocked position 2201. FIG. 23 illustrates the locking cover 2202 in an installed and locked position 2203.

FIGS. 22 and 23 illustrates two clamp devices 2204 coupled or clamped onto a surface 2200, but fewer or more than two clamp devices 2204 can be utilized. In FIGS. 22 and 23, the surface 2200 is a portion of a bed rail of a vehicle. For example, as illustrated in FIGS. 22 and 23, the clamp devices 104 can clamp onto the elongate recess 25 of a base member of a truck bed rail. For example, as discussed above, the truck bed rail can have a planar extension 22 having the elongate recess 25 running along at least portion of its length. The elongate recess 25 can be configured to receive a portion of the clamp device 2204, as an aid to secure the clamp 2204 thereon. While FIGS. 22 and 23 illustrate the clamp devices 2204 clamped to a vehicle, in other implementations, the clamp devices 2204 can be clamped onto a desk, a work table, a beam, or any other surface which can be gripped by clamp devices 2204.

In FIGS. 22 and 23, the clamp devices 2204 are C-clamps but can be G-clamps, miter clamps, bench clamps, vises, hand screws, setscrews, or any other device or mechanism that allows one object to clamp, grip, or otherwise couple to another object. As illustrated in FIGS. 22 and 23, the clamp devices 2204 can each have an operator-engageable portion 2206. For example, the operator-engageable portion 2206 can be a portion of the screw or bolt operable by a user to engage or clamp the clamp device 2204 to a surface 2200. In FIGS. 22 and 23, the operator-engageable portion 2206 can be rotated to engage or disengage an end of the screw, opposite to the operator engageable portion 2206, from the surface 2200.

As illustrated in FIG. 22, the locking cover 2202 is in the unlocked and uninstalled configuration 2201. For example, the locking cover 2202 is disengaged or uncoupled from the clamp device 2204. In FIG. 22, an adapter 2208 can be installed to the clamp device 2204. For example, the adapter 2208 can be installed on a portion of the clamp device 2204 adjacent the operator-engageable portion 2206. In FIG. 22, the adapter 2208 is installed on the portion of the clamp device 2204 from which the operator-engageable portion 2206 protrudes. The adapter 2208 can be configured to couple the locking cover 2202 to the clamp device 104. Also illustrated in FIG. 22, the locking cover 2202 can include a lock 2210 coupled thereto. In FIG. 22, the lock 2210 is in an unlocked configuration. For example, the unlocked configuration can be identified by the vertical orientation a line 2211 or recess formed on the lock 2210. As the lock is in the unlocked configuration, the locking cover 2202 can be removed from engagement or coupling the clamp device 2204 (or adapter 2208 as illustrated in FIG. 22).

FIG. 23 illustrates the locking cover 2202 in the installed and locked position 2203. In FIG. 23, the locking cover 2202 is received by the clamp device 2204. Specifically, in the example illustrated in FIG. 23, the locking cover 2202 is received by the adapter 2208 that is coupled to the clamp device 2204. As illustrated in FIG. 23, when the locking cover 2202 is in the installed and locked position 2203, the locking cover 2202 shrouds the operator-engageable portion 2206 of the clamp device 2204. Such shrouding thereby prevents unauthorized access to the operator-engageable portion 2206 and thereby prevents any unauthorized or unintentional adjustments, removal, or loosening of the clamp device 2204 from the surface to which the clamp devices 2204 is coupled. In FIG. 23, the installed and locked position 2203 of the locking cover 2202 can be identified by the horizontal orientation of the line 2211 of the lock 2210. While FIGS. 22 and 23 illustrate the locked position 2203 corresponding to a horizontal orientation of the line 2211 and the unlocked position 2201 corresponding to a vertical orientation of the line 2211, in other implementations, the horizontal orientation of the line 2211 can correspond to the unlocked position 2201 and the vertical orientation of the line 2211 can correspond to the locked position. Other markings or identifiers can be utilized to identify the locked 2203 and unlocked 2201 positions of the locking cover 2202.

Figure 24:
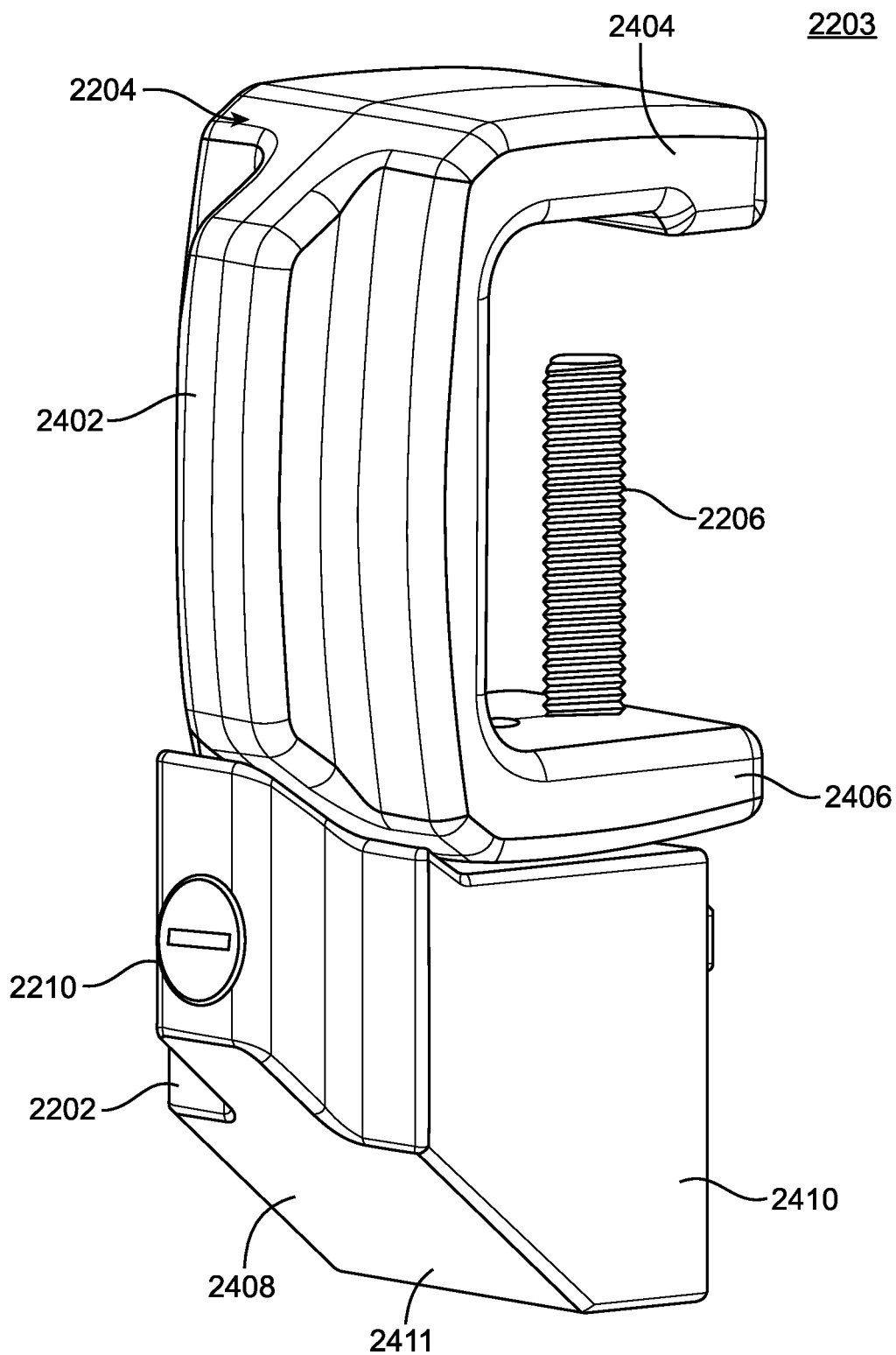
FIG. 24 is an illustration of a perspective view of the locking cover coupled to a clamp device in accordance with an example implementation of the present disclosure, wherein the locking cover is in the installed and locked position.

FIG. 24 illustrates a perspective view of a front of an example locking cover 2202 coupled to a clamp device 2204. In FIG. 24, the clamp device 2204 is a C-clamp but can be a C-clamp, a G-clamp, a miter clamp, a bench clamp, a vise, a hand screw, a setscrew, or any other device or mechanism that allows one object to clamp, grip, or otherwise couple to another object. As illustrated in FIG. 24, the clamp device 2204 includes a body 2402. The body 2402 has a first portion 2404 for engaging a surface. For example, the first portion 2404 can be shaped or oriented engage the elongate recess 25 of a base member of a truck bed rail. The body 2402 can also include a second portion 2406 through which the operator-engageable portion 2206 can be received. The first portion 2404 and the second portion 2406 of the body 2402 can form the C-shape of the clamp device 2204, when the clamp device 2204 is a C-clamp. While not shown, the second portion 2406 can define an aperture through which the operator-engageable portion 2206 can be received. The operator-engageable portion 2206 can be a bolt but can also be a screw, a jaw, or any other operator-engageable portion that when engaged or operated by a user causes the clamp device 2204 to clamp or grip a surface.

As illustrated in FIG. 24, a portion of the operator engageable portion 2206 is housed or shrouded by the locking cover 2202. In FIG. 24, the locking cover 2202 is coupled to the clamp device 2204 adjacent the second portion 306 of the clamp device body 2402. In FIG. 24, the locking cover 2202 is illustrated in the locked and installed position 2203. The locking cover 2202 can include a cover body 2408. The cover body 2408 can have a plurality of perimeter walls 2410, 2411 that define a receiving cavity (shown in FIG. 25) within which at least a portion of the operator-engageable portion is located when the locking cover 2202 is in the installed and locked position 2203 on the clamp device 2204.

Figure 25:
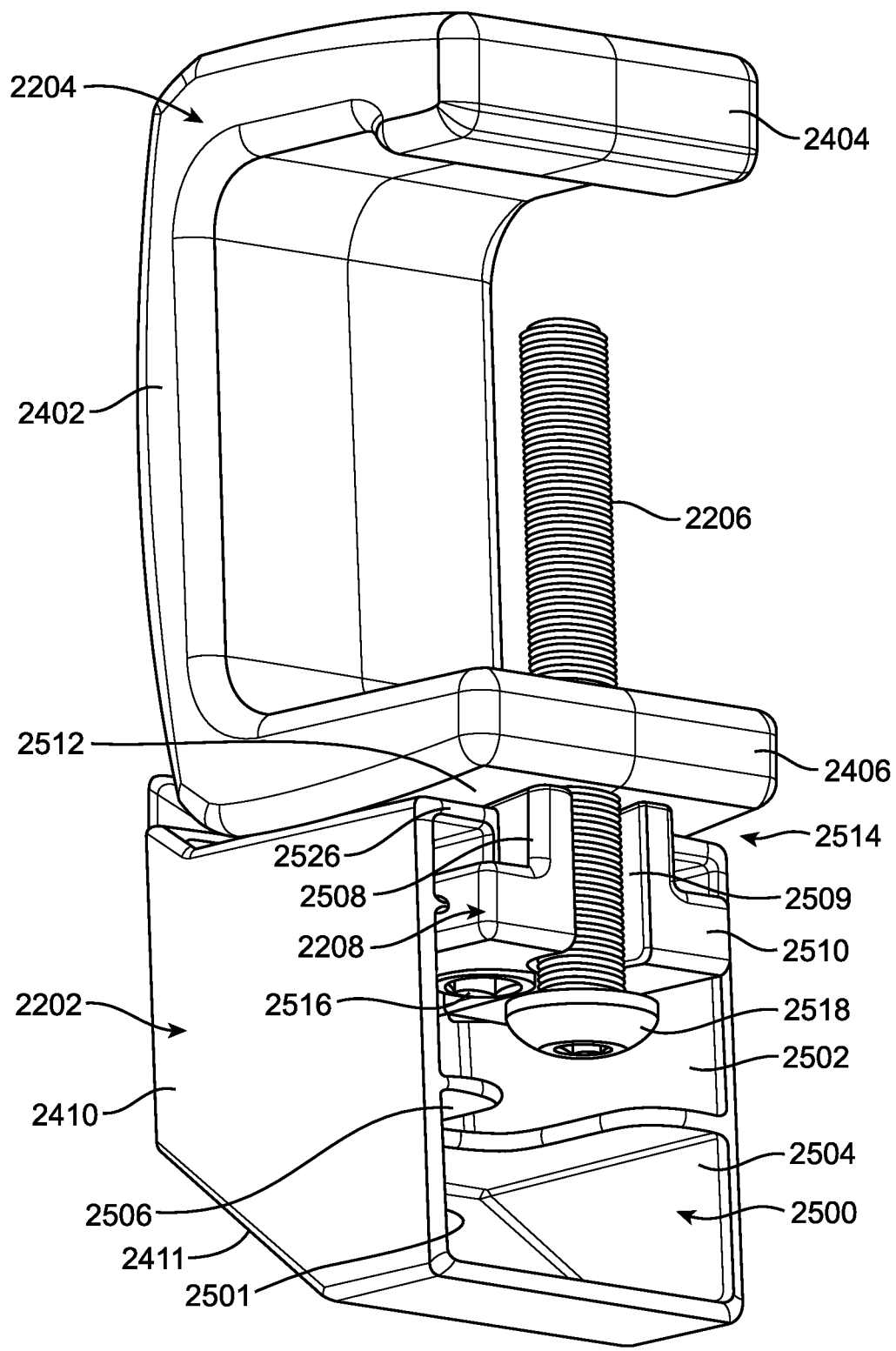
FIG. 25 is an illustration of a rear view of the locking cover illustrated in FIG. 24.

FIG. 25 illustrates rear view of the example locking cover 2202 coupled to the clamp device 2204 illustrated in FIG. 24. As illustrated in FIGS. 24 and 25, the perimeter walls 2410, 2411 of the cover body 2408 can predominantly surround the operator-engageable portion 2206 of the clamp device 2204 in the installed and locked position 2203. In other implementations, the perimeter walls 2410 of the cover body 2408 can surround at least half of the operator-engageable portion 2206 of the clamp device 2204 in the installed and locked position 2203. In still other implementations the perimeter walls 2410 of the cover body 2408 can surround accessible portions of the operator-engageable portion 2206 of the clamp device 2204 in the installed and locked position 2203. In at least one implementation, at least one of the perimeter walls 2410 (for example, a top wall 2512) can form an opening 3110 (illustrated in FIG. 31) sufficiently large enough to permit the operator-engageable portion 2206 of the clamp device 2204 to pass there-through. As illustrated in FIGS. 24 and 25, the perimeter walls 2410 do not form a complete housing. That is, as illustrated in FIGS. 24 and 25, the locking cover 2202 has at least one open face. For example, one face of the locking cover 2202 is open and does not include a perimeter wall 2410, thereby exposing an operator-engageable portion 2206 that may be shrouded by the locking cover 2202 when the clamp device 2204 is not coupled or clamped to a surface. Although the locking cover 2202 includes an open face, tampering or unauthorized access to the operator-engageable portion 2206 is prevented when the clamp device 2204 is coupled or clamped to a surface (for example a truck bed rail) and the locking cover 2202 is coupled to the clamp device 2204. In such a configuration, the open face of the locking cover 2202 can face or be oriented against a side wall of the truck to which the clamp device 2204 is clamped. Thus, in such an orientation, the locking cover 2202 shrouds the operator-engageable portion 2206 of the clamp device 2206, and the locking cover 2202 and the side wall of the vehicle can substantially entirely shroud or house the operator-engageable portion 2206 to prevent unauthorized access thereto.

FIG. 25 illustrates the receiving cavity 2500 defined by the perimeter walls 2412 of the cover body 2410. Additional details regarding the receiving cavity 2500 will be described in relation to FIG. 31. The cover body 2410 can include a divider 2506 configured to divide the receiving cavity 400. In FIG. 25, the divider 406 can divide the receiving cavity 2500 into a first cavity 2502 and a second cavity 2504. For example, as illustrated in FIG. 25, the divider 2506 is formed from an interior surface 2501 of the cover body 2410. For example, the divider 2406 can be co-molded to the interior surface 2501 of the cover body 2410. In other implementations, the divider 2506 can be coupled to the interior surface 2501 of the cover body 2410. For example, the divider 2506 can be adhered, welded, affixed, or otherwise attached to the interior surface 401 of the cover body 2410. The divider 2506 can reinforce the structure of the cover body 2410. The divider 2506 can also receive and maintain the alignment of the operator-engageable portion 2206 when the operator-engageable portion 2206 is of a size that extends into the second cavity 2504.

As illustrated in FIG. 25, the locking cover 2202 can be coupled to the clamp device 2204 by an adapter 2208. In FIG. 25, the adapter 2208 can be a structure that is couplable to or installable upon the clamp device 2204. As illustrated in FIG. 25, the adapter 2208 can be coupled to the second portion 2406 of the clamp device 2204. Specifically, in one implementation, the adapter 2208 can be coupled to or installed upon a bottom surface 2516 of the second portion 2406 of the clamp device 2204. In FIG. 25, the adapter 2208 can be coupled to the second portion 2406 of the clamp device 2204 by a fastener portion 2516. For example, the fastener portion 2516 can be a bolt, a screw, or any other fastener configured to couple the adapter 2208 to the clamp device 2204.

In FIG. 25, the adapter 2208 can be a structure that is configured to receive the cover body 310 in the installed and locked position 2203. In FIG. 25, and as will be described in more detail with respect to FIGS. 26 and 27, the adapter 2208 is a structure that includes a portion shaped as a "T." For example, the adapter 2208 can have a central portion 2508 and extensions 2510 extending from the central portion to form the T-shape. In other implementations, the adapter can have a shape other than a "T," as will be discussed below As illustrated in FIG. 25, the central portion 2508 can define a recess 2509 configured to receive at least a portion of the operator-engageable portion 2206 of the clamp device 2204 in the installed and locked position 2203 of the locking cover 2202. For example, the recess 2509 can be configured to receive the end of the operator-engageable portion 2206 that includes the head 2518 of the operator-engageable portion 2206. The head 2518 of the operator-engageable portion 2206 can be operated by a user to rotate the operator-engageable portion 2206 to tighten or loosen the grip of the clamp device 2202 to a surface. As illustrated in FIG. 25, the head 2518 is a hex head of a bolt, but can be Phillips head, a slot, a notch, or any other head of an operator-engageable portion 2206 by which the operator can grip to rotate the operator-engageable portion 2206 or by which the operator can insert a tool to rotate operator-engageable portion 2206.

The extensions 2510 of the adapter 2208 can extend from the central portion 2508, as illustrated in FIG. 25. For example, the extensions 2510 can form a lip or an elongate rail which can engage the locking cover 2202 in the installed and locked position 2203. As illustrated in FIG. 25, the extensions 2501 of the adapter 2208 can define a channel 2514 with a bottom surface 2512 of the second portion 2406 of the clamp device 2204. The channel 2514 can be configured to receive the cover body 2410 when the locking cover 2202 and the clamp device 2204 are in the installed and locked position 2203. For example, the channel 2514 can be an engagement portion configured to engage a cover engagement receiving portion. The cover body 2410 of the locking cover 2202 can include a clamp device engagement portion 2520 to engage the channel 2514. For example, the channel 2514 and the clamp device engagement portion 2520 can be complimentarily shaped such that the clamp device engagement portion 2520 of the cover body 2408 is receivable by the channel 2514 (for example, the cover engagement receiving portion). In FIG. 25, the clamp device engagement portion 2520 of the cover body 2410 can be an elongate rail formed on the perimeter wall 2510 that will be adjacent to the bottom surface 2512 of the clamp device 2204 in the installed and locked position 2203.

While FIG. 25 illustrates the channel 2514 being defined by the adapter 2208 that is a separate component from the clamp device 2204, the adapter 2208 and the clamp device 2204 can be one component. For example, the adapter 2208 can be co-molded or formed on the bottom surface 2512 of the clamp device 2204. However, having the adapter 2208 as a separate component can be advantageous if the clamp device 2204 is power coated. Power coating is typically applied to simple shapes that have few crevices, indentations, corners, and recesses. Having the adapter 2208 as a separate component from the clamp device 2204 allows for an even and complete covering of the adapter 2208 and clamp device 2204 during power coating. That is, as the adapter 2208 and the clamp device 2204 are separate components, each surface thereof can receive an even and complete coating of the power coat.

In at least one implementation, the locking cover 2202 can be coupled to the clamp device 2204 without an adapter. For example, the clamp device 2204 can include a cover engagement receiving portion 2514. The cover engagement receiving portion 2514 can be formed by protrusions extending from the bottom surface 2512 of the clamp device 2204 through which the operator-engageable portion 2206 is inserted. The cover engagement receiving portion 2514 can be a channel similar to the channel formed by the extensions 2510 of the adapter 2208 illustrated in FIG. 25. In other implementations, the cover engagement receiving portion 2514 can be track formed or coupled to the clamp device 2204. As discussed above, the locking cover 2202 can include a clamp device engagement portion 2520. The clamp device engagement portion 2420 can be an elongate rail, a portion of a surface complimentarily shaped to the cover engagement receiving portion 2514 of the clamp device 2202, or an elongate engagement surface. The clamp device engagement portion 2420 can have an elongate engagement surface having a length greater than a width thereof. For example, the clamp device engagement portion 2420 can be shaped, dimensioned, or both shaped and dimensioned such that the clamp engagement portion 2420 is receivable within the cover engagement receiving portion 2514 of the clamp device 2204. The complimentarily configuration or shapes of the clamp engagement portion 2420 and the cover engagement receiving portion 2514 of the clamp device 2204 can allow for the coupling between the clamp device 2204 and the locking cover 2202.

Figure 26:
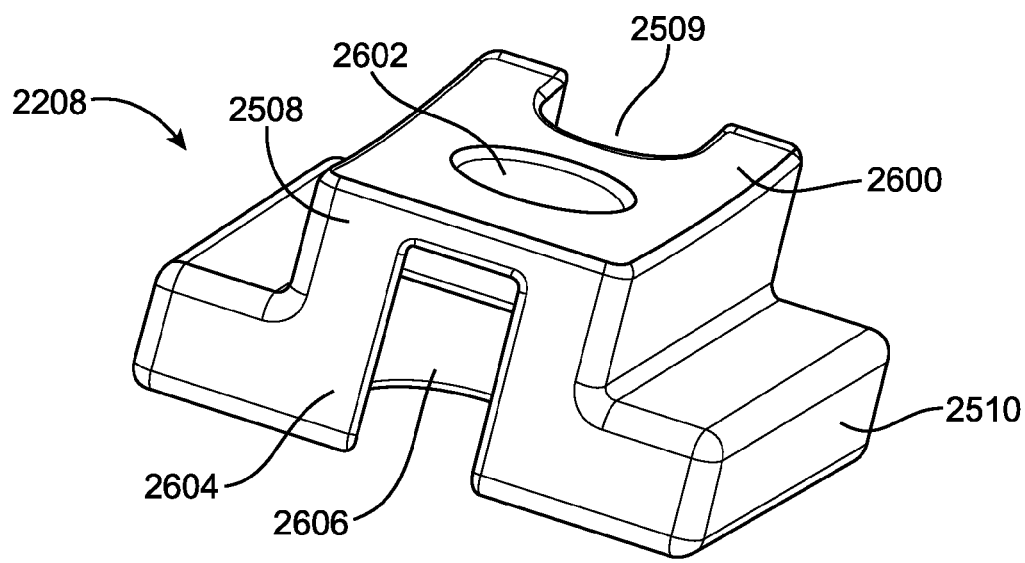
FIG. 26 is an illustration of a perspective of an example adapter for a locking cover in accordance with an example implementation of the present disclosure.
Figure 27:
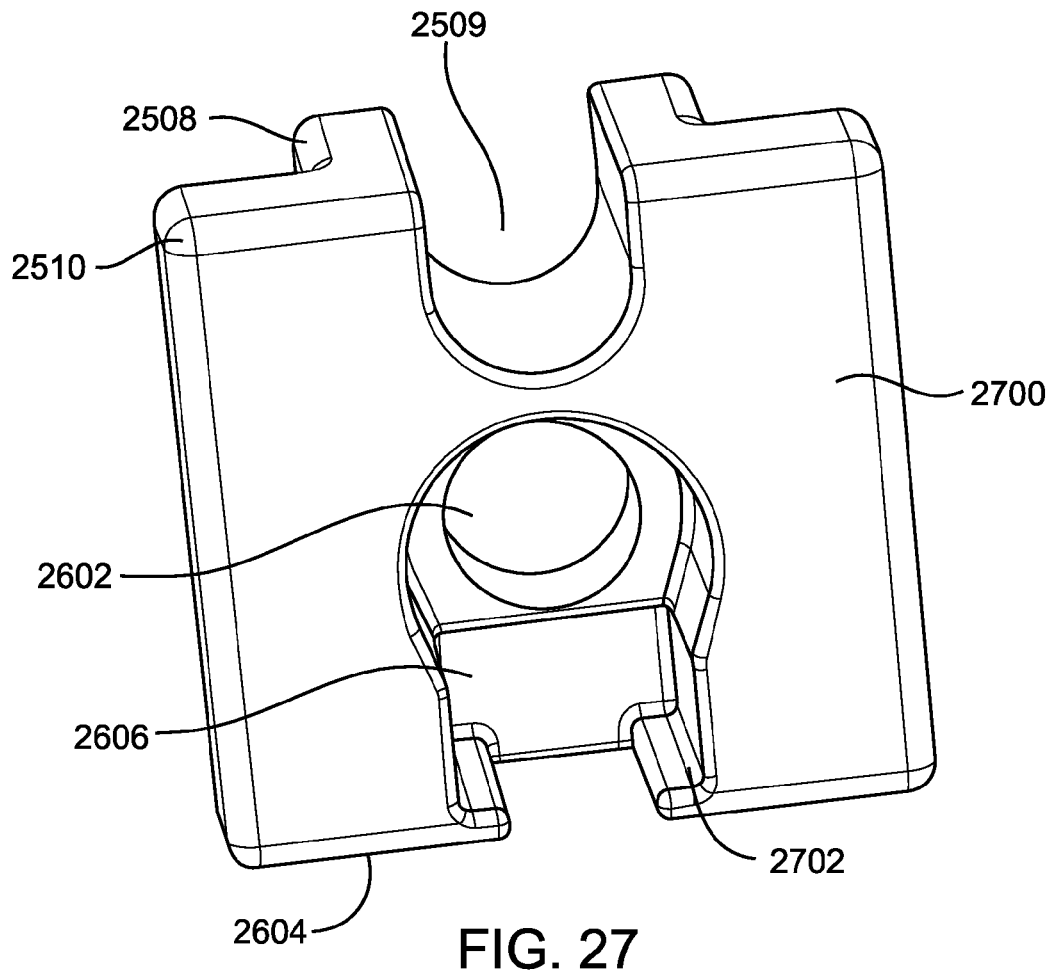
FIG. 27 is an illustration of a bottom view of the example adapter illustrated in FIG. 26.

Returning to an implementation in which an adapter 2208 can be utilized to couple the clamp device 2204 and the locking cover 2202, FIGS. 26 and 27 illustrate an example of such an adapter 2208. FIG. 26 illustrates a perspective view of an example adapter 2208. FIG. 27 illustrates a bottom view of the example adapter 2208 illustrated in FIG. 26.

As illustrated in FIGS. 26 and 27, the adapter 2208 can be a T-shaped structure. For example, the adapter 2208 can have a central portion 2508 and two extensions 2510 extending therefrom to form the T-shape. As discussed above, the two extensions 2510 of the adapter 2208 can form the channel 2514 or the cover engagement receiving portion 2514 with the clamp device 2204 when the clamp device 2204 and the adapter 2208 are coupled to one another. In other implementations, the adapter 2208 can be an I-shape, L-shape, U-shape, square, rectangle, oval, circular, or have any other shape configured to receive at least a portion of an operator-engageable portion 2206 of a clamp device 2204 in the installed and locked position 2203. As illustrated in FIG. 26, the adapter 2208 can define a recess 2509. The recess can be configured to receive at least a portion of an operator-engageable portion 2206 of a clamp device 2204 in the installed and locked position 2203. In FIG. 26, the recess 2509 has a U-shape but can be circular or any other shape. In FIG. 26, the recess 2509 can be sized to accommodate operator-engageable portions 2206 having a variety of diameters. For example, the recess 2509 can have a radius sized to be sized to accommodate operator-engageable portions 2206 having a variety of diameters. That is, the recess 2509 can be sized to accommodate operator-engageable portions 2206 (for example, bolts or screws) having diameters ranging from ¼" to 1½", or any other range of diameters. For example, a range of diameters of bolts conventionally utilized in clamp devices configured to clamp on to a vehicle surface.

Also illustrated in FIG. 26, the top surface 2600 of the adapter 2208 can define an aperture 2602. The aperture 2602 can be configured to receive the fastener portion 2516. As discussed above, the fastener portion 2516 can be a bolt, screw, or any other device or mechanism configured to couple the adapter 2208 to the clamp device 2204. When the adapter 2208 is coupled to the clamp device 2204, the fastener portion 2516 can be housed or received in in a lock cavity 2606 of the adapter 2208. For example, as illustrated in FIGS. 26 and 27, a wall 2604 and a bottom surface 2700 of the adapter 2208 can define the lock cavity 2606. The wall 2604 of the adapter 2208 can also form a lock engagement surface 2702. In FIG. 27, the wall 2604 forms two lock engagement surfaces 2702. The lock engagement surface 2702 can be configured to abut or engage a locking tab of the lock 2210 of the locking cover 2202 in the locked and installed position 2203 of the locking cover 2202 and a locked configuration of the lock 2210, as will be discussed in further detail with respect to FIG. 32.

Figure 28:
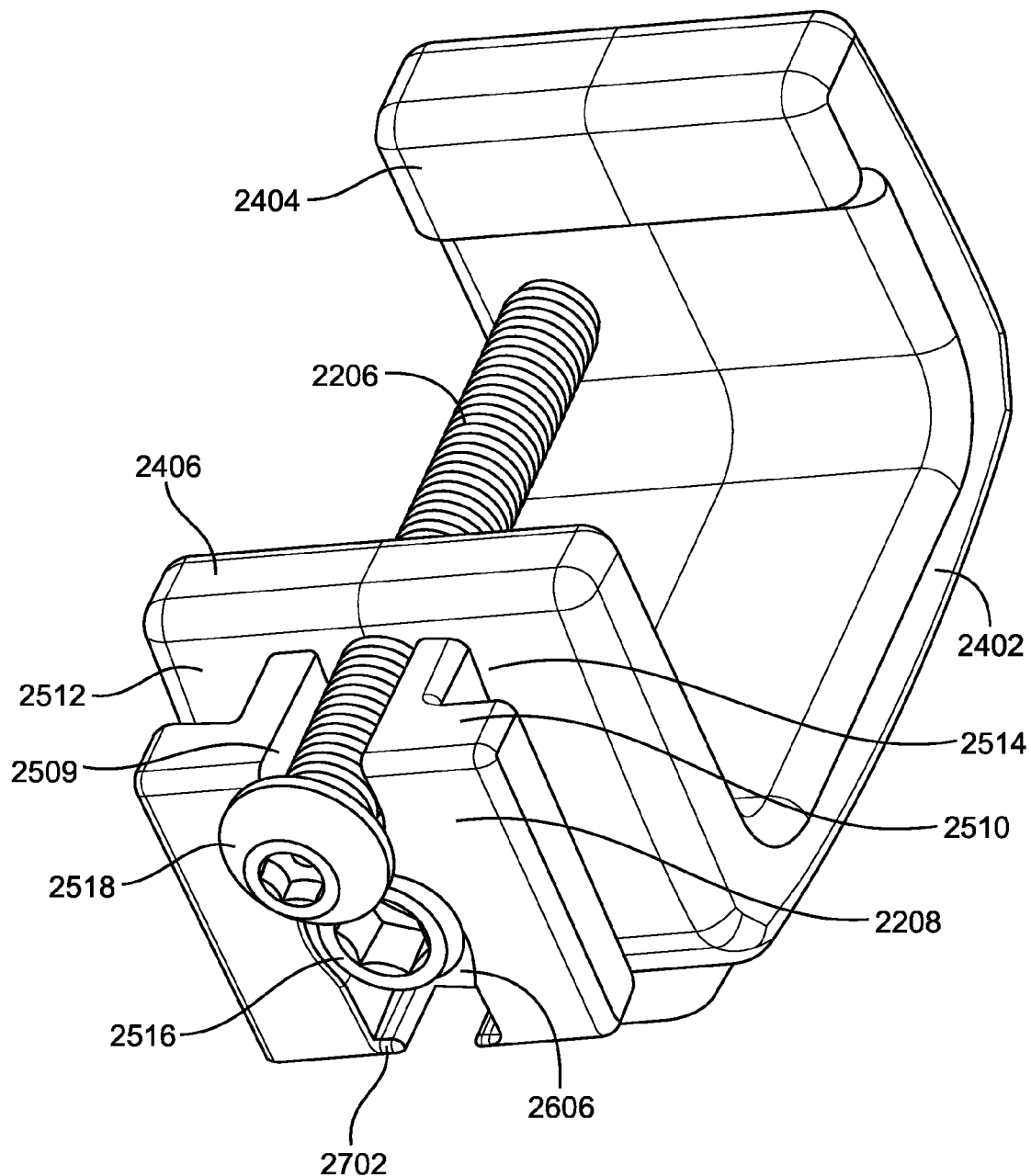
FIG. 28 is an illustration of a bottom perspective view of an example adapter coupled to an example clamp device in accordance with an example implementation of the present disclosure.

FIG. 28 illustrates a perspective view of an example clamp device 2204 with the operator-engageable portion 2206 with an example adapter 2208 coupled thereto by a fastener portion 2516. As illustrated in FIG. 28, when the adapter 2208 and the clamp device 2204 are coupled thereto, the fastener portion 2516 is received in the lock cavity 2606. Specifically, as illustrated in FIG. 28, a head of the fastener portion 2516 is received in the lock cavity 2606. Also illustrated in FIG. 28, the operator-engageable portion 2206 is received within the recess 2509 formed by the adapter 2208. In FIG. 28, the head 2518 of the operator-engageable portion 2206 can extend beyond the bottom surface 2700 of the adapter 2208. As illustrated in FIG. 28, since the lock cover is not coupled to the adapter 2208 or the clamp device 2204, the head 2518 of the operator-engageable portion 2206 is accessible by the user or operator to tighten or loosen the grip of the clamp device 2204 to a surface.

Figure 29:
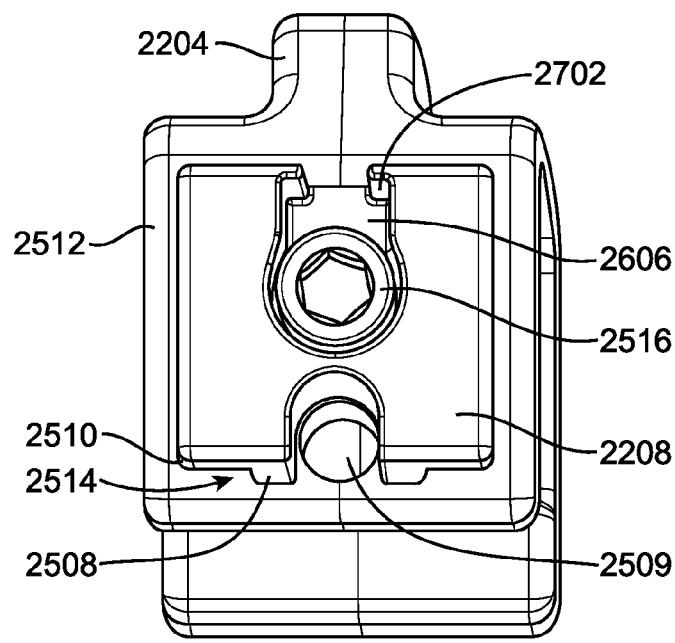
FIG. 29 is an illustration of a bottom view of an example adapter coupled to an example clamp device in accordance with an example implementation of the present disclosure, where the operator-engageable portion of the clamp device has been removed.
Figure 30:
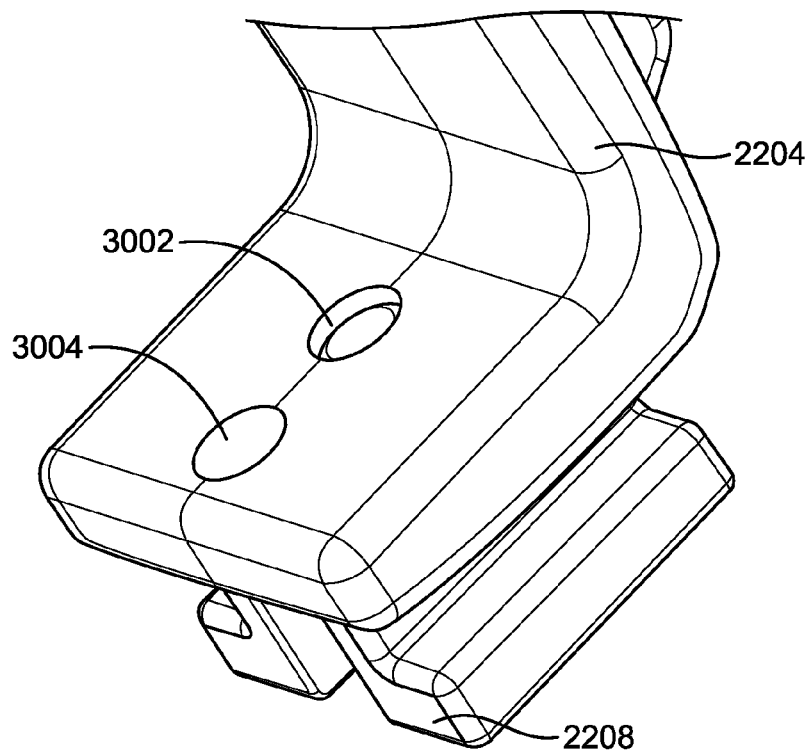
FIG. 30 is an illustration of a top perspective view of the example adapter coupled to the example clamp device illustrated in FIG. 29.
Figure 31:
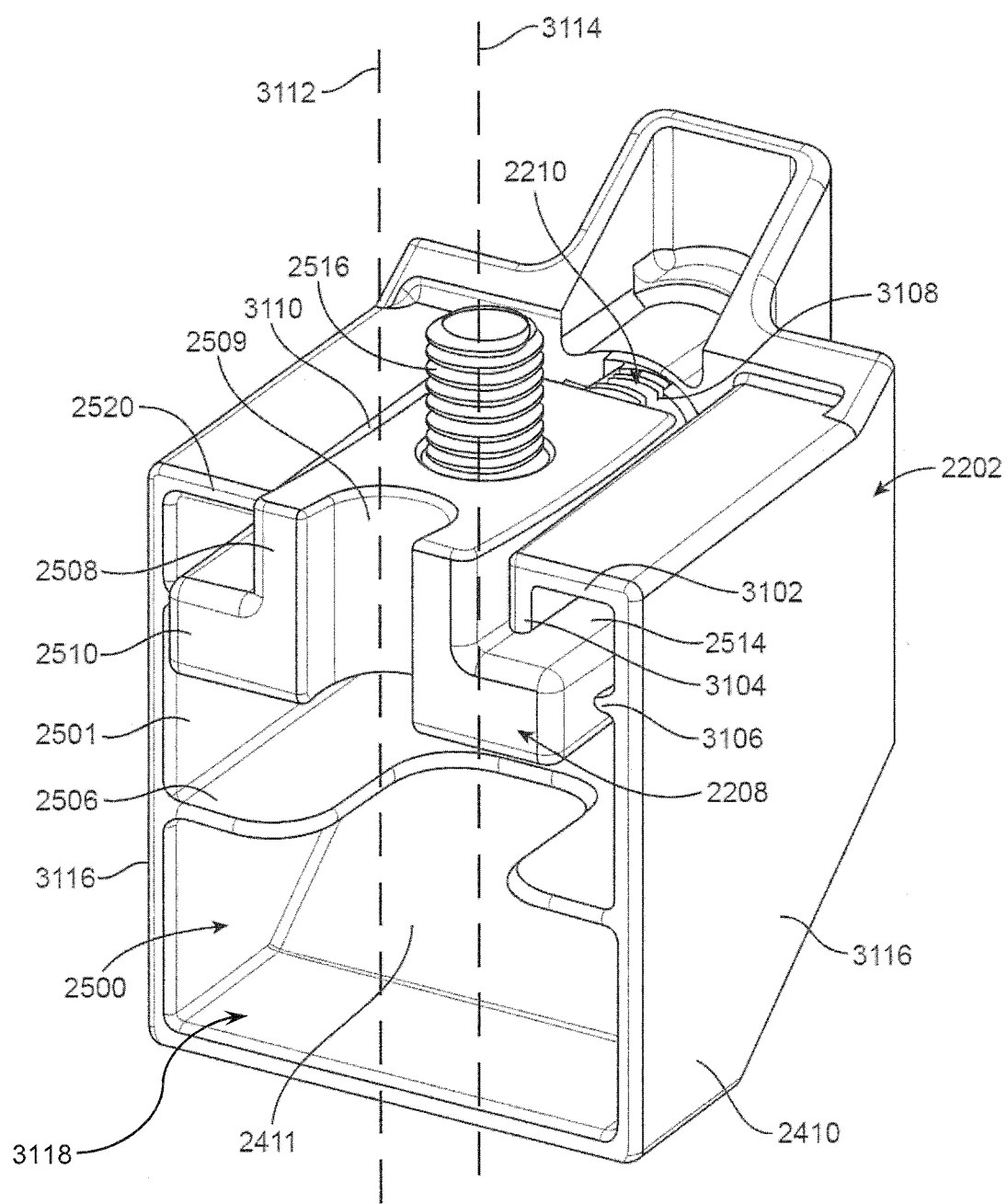
FIG. 31 is an illustration of a perspective view of an example locking cover coupled with an example adapter in accordance with an example implementation of the present disclosure.

FIGS. 29 and 30 illustrate the coupling of the adapter 2208 and the clamp device 2204 without the operator-engageable portion 2206 and without the locking cover. FIG. 29 illustrates a bottom view of the adapter 2208 coupled to the clamp device 2204. FIG. 30 illustrates a top perspective view of the adapter 2208 and the clamp device 2204. FIG. 29 illustrates the orientation of the adapter 2208 with respect to the clamp device 2204 to align the recess 2509 and aperture 2602 of the adapter 2208 with the clamp device 2204. As illustrated in FIG. 29, when the adapter 2208 is coupled to the clamp device 2204, the recess 2509 defined by the adapter 2208 aligns with an operator-engageable portion aperture 3004 defined by the clamp device 2204. As the recess 2509 aligns with the operator-engageable portion aperture 3004, the operator engageable portion 2206 can be received within the recess 2509. FIG. 30 illustrates the fastener portion receiving aperture 3002 of the clamp device 2204. The fastener portion receiving aperture 3002 can be configured to receive the fastener portion 2516 that couples the adapter 2208 to the clamp device 2204. For example, the fastener portion 2516 can be a threaded bolt (as illustrated in FIG. 31). The fastener portion receiving aperture 3002 can be threaded to matingly engage the threads of the fastener portion 2516 when the adapter 2208 is coupled to the clamp device 2204.

Also, FIGS. 29 and 30 illustrate the orientation of the adapter 2208 to the clamp device 2204 to form the cover engagement receiving portion (for example, the channel 2514). As illustrated in FIG. 29, the bottom surface 2510 of the clamp device 2204 can define a first boundary of the channel 2514. The central portion 2508 of the adapter 2208 structure can form a second boundary of the channel 2514. The extension (for example, one of the extensions 2510) of the adapter 2208 can form a third boundary of the channel 2514. The resulting channel 2514 is then bound at three sides to form a U-shaped or C-shaped channel or track. The resulting channel 2514 can be configured to receive a complimentarily configured clamp device engagement portion (for example, an elongate rail 2520) of the locking cover 2202. In FIG. 29, one or both of the extensions 2510 can each form a cover engagement receiving portion with the clamp device 2204 when the adapter 2208 and the clamp device 2204 are coupled. In at least one implementation, the adapter 2208 and the clamp device 2204 can form one cover engagement receiving portion, for example, where the adapter 2208 is an L-shaped adapter.

FIG. 31 illustrates an example adapter 2208 coupled to an example locking cover 2202. As illustrated in FIG. 31, the locking cover 2202 includes a plurality of perimeter walls 2410. The plurality of perimeter walls 2410, 2411, 3102, 3118 can include at least one side wall 2410 (two side walls are illustrated in FIG. 31), a bottom wall 3118, a front wall 2411, and a top wall 3102. In FIG. 31, the side walls 2410, the front wall 2411, the bottom wall 3118, and the top wall 3102 can define the receiving cavity 2500 of the locking cover 2202. FIG. 31 illustrates the longitudinal axis 3112 of the cover body 2410 of the locking cover 2202. Also illustrated in FIG. 31 is the longitudinal axis 3114 of the fastener portion 2516 of the adapter 2208. As illustrated in FIG. 31, the longitudinal axis 3112 of the cover body 2410 can be oriented substantially parallel to the longitudinal axis 3114 of the fastener portion 2516 when the fastener portion is connected to the clamp device (not shown) in the installed and locked position 2203.

In at least one implementation, at least a portion of the receiving cavity 2500 can have a rectangular cross-sectional shape taken perpendicular to the longitudinal axis 3112 of the locking cover 2202. In another implementation, the receiving cavity 2500 can have a rectangular cross-sectional shape when taken perpendicular to the longitudinal axis 3112 of the locking cover 2202. In an implementation where the receiving cavity 2500 is divided into a plurality of cavities (for example, two cavities as illustrated in FIG. 25), each of the receiving cavities 2500 can have the same cross-sectional shape or can have different cross-sectional shapes. For example, the receiving cavities 2500 can have the same cross-sectional shape to provide a uniformly-shaped structure. In other implementations the receiving cavities 2500 can have different cross-sectional shapes to allow for structural reinforcement of the locking cover 2202.

As illustrated in FIG. 31, the perimeter walls 2410, 2411, 3118, 3102 can include at least one substantially planar exterior surface 3116 oriented substantially parallel to the longitudinal axis of the 3112 of the cover body of the locking cover 2202. In FIG. 13, the perimeter walls include a plurality of substantially planar exterior surfaces 3116 oriented substantially parallel to the longitudinal axis of the 3112 of the cover body of the locking cover 2202. In at least one implementation, at least one of substantially planar exterior surface can be oriented substantially orthogonal to the longitudinal axis of the 3112 of the cover body of the locking cover 2202. For example, the substantially planar exterior surface of the bottom wall 3118 can be oriented substantially orthogonal to the longitudinal axis of the 3112 of the cover body of the locking cover 2202. As illustrated in the example implementation of FIG. 31, at least one substantially planar exterior surface can be oriented oblique to the longitudinal axis 3112 of the cover body of the locking cover 2202. For example, the substantially planar exterior surface of the front perimeter wall 2411 can be oriented oblique to the longitudinal axis 3112 of the cover body of the locking cover 2202.

FIG. 31 illustrates the clamp device engagement portion 2520 of the cover body of the locking cover 2202. In FIG. 31, the clamp device engagement portion 2520 is an elongate rail. For example, as illustrated in FIG. 31, the elongate rail 2520 can be formed by a top wall 3102 of the cover body and a lip 3104 formed on the top wall 3102. For example, the lip 3104 can extend from the top wall 3102 towards the receiving cavity 2500 of the locking cover 2202. As illustrated in FIG. 31, the lip 3104 and the top wall 3102 can form a C-shape or a U-shape to engage a complimentarily configured cover engagement receiving portion 2514. As discussed above, the cover engagement receiving portion 2514 can be formed by the adapter 2208 and a bottom surface of the clamp device (not shown) when the adapter 2208 is coupled to the clamp device. In other implementations, the cover engagement receiving portion 2514 can be a track formed on the bottom surface of the clamp device (not shown). In the example implementation illustrated in FIG. 31, an interior wall of the cover body can form a ridge 3106 or other protrusion to engage the adapter 2208 when the clamp device engagement portion 2520 is received in the cover engagement receiving portion 2514. The ridge 3106 can extend along the interior wall of the cover body perpendicularly to the longitudinal axis 3112 of the cover body. The ridge 3106 can be a bump, a hump, or any other protrusion. The ridge 3106 can be a uniform ridge extending along the interior wall, a series of bumps extending along the interior wall such that the series of bumps collectively form a ridge, or any other protrusion or series of protrusions. The ridge 3106 can engage a surface of the adapter 2208 or cover engagement receiving portion 2514 when the clamp device engagement portion 2520 is received in the cover engagement receiving portion 2514. The ridge 3106 can align the clamp device engagement portion 2520 is received in the cover engagement receiving portion 2514. The ridge 3106 can also provide for stabilize the clamp device engagement portion 2520 is received in the cover engagement receiving portion 2514, thereby ensuring that the locking cover 2202 remains engaged or coupled to the adapter 2208, and thus the clamp device 2202. In an implementation where the locking cover 2202 and the clamp device 2204 can be coupled without an adapter 2208, the ridge 3106 can engage the cover engagement receiving portion of the clamp device 2204.

FIG. 31 also illustrates the lock 2210 coupled to the cover body of the locking cover 2202. The lock 2210 can be configured to lock the locking cover 2202 to the adapter 2208 when the adapter 2208 is installed upon the clamp device 2204. When the locking cover 2202 is locked to the adapter 2208 and the adapter is installed upon the clamp device 2204, the locking cover 2202 can be coupled to the clamp device 2204 in the installed and locked position. FIG. 31 illustrates the lock-cylinder 3108 of the lock 2210. The lock-cylinder 3108 can lock the locking cover 2202 to the adapter 2208 as will be discussed in greater detail with respect to FIG. 32. In FIG. 31, the lock-cylinder 3108 can have a portion that is fixedly connected to the cover body of the locking cover 2202. The lock-cylinder 3108 can also have a longitudinal axis 3206 (shown in FIG. 32) that is substantially perpendicular to the longitudinal axis of the cover body. The longitudinal axis 3206 can also be the rotational axis of the lock-cylinder.

In FIG. 31, the lock 2210 is in the unlocked configuration. In the illustrated unlocked configuration, the locking cover 2202 is received in the cover engagement receiving portion 2514. In such a configuration, the locking cover 2202 can prevent access to an operator-engageable portion 2206 (not shown) of a clamp device, when the operator-engageable portion 2206 is received therein. However, to further ensure that access to the operator-engageable portion 2206 is prevented, the locking cover 2202 can be placed in the locked configuration, thereby locking the locking cover 2202 to the cover engagement receiving portion 2514. In the locked configuration, the locking cover 2202 cannot be removed, thereby preventing against unauthorized access to an operator-engageable portion 2206. As access to the operator-engageable portion 2206 is prevented in the installed and locked configuration of the locking cover 2202 to the clamp device (not shown), tampering of the clamp device is prevented. The operator can thereby ensure that the clamp device 2204 remains clamped to a surface and that the clamp device 2204 cannot be released from being clamped to the surface when the locking cover 2202 is in the installed and locked configuration.

Figure 32:
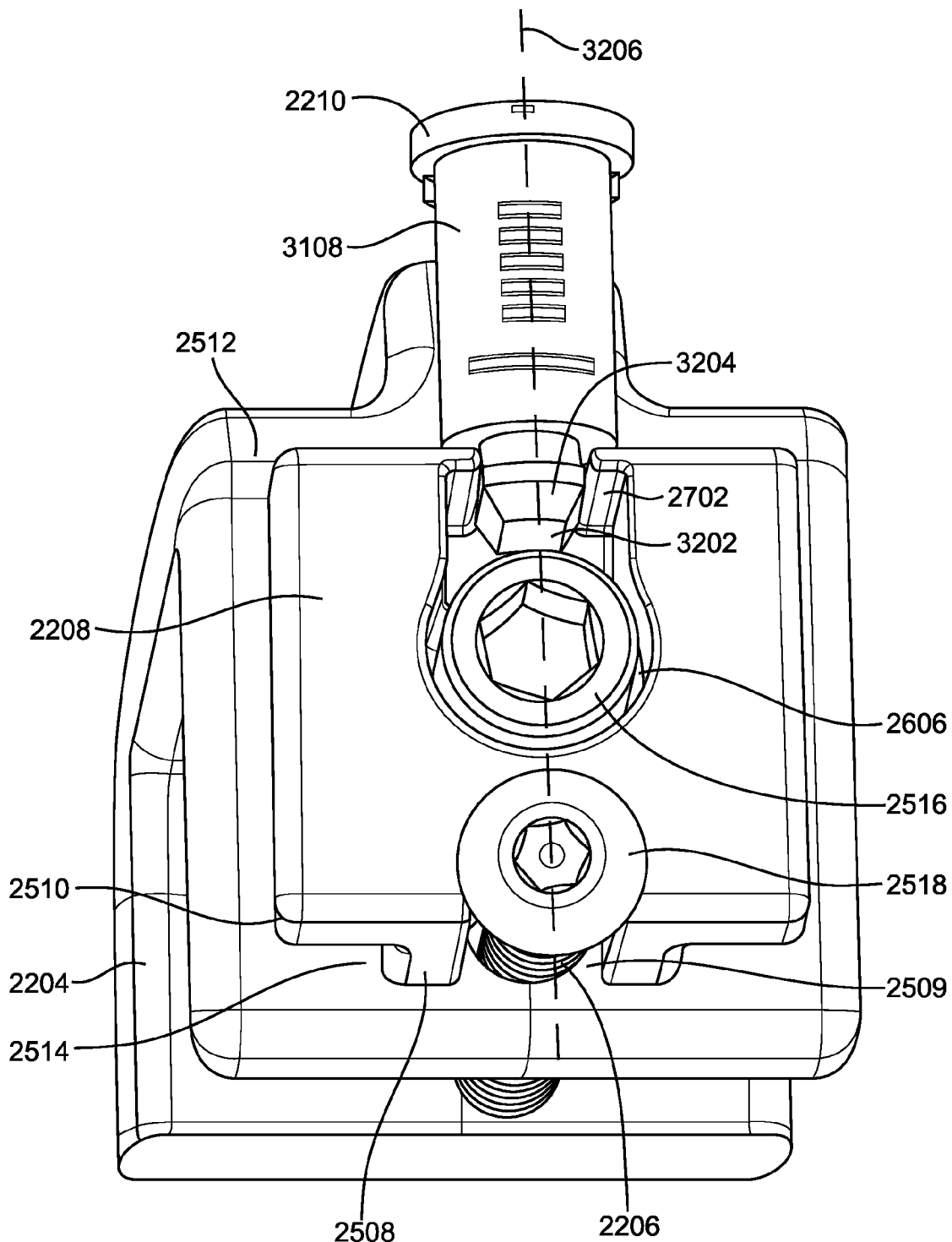
FIG. 32 is an illustration of a bottom perspective view of an example clamp device coupled to an example adapter illustrating the orientation and engagement of a lock 2210 of a locking cover 2202, with the locking cover removed.

FIG. 32 is a bottom view of an example adapter 2208 coupled to an example clamp device 2204 illustrating the interaction between the lock 2210 of the locking cover 2202 but with the cover body removed. As illustrated in FIG. 32, when the locking cover (not shown) is coupled to the adapter 230, a distal end of the lock-cylinder 3108 is received in the lock cavity 2606 of the adapter 2208. The distal end of the lock-cylinder 3108 can include an engagement portion 3202 transitional between locked and unlocked configurations. For example, the engagement portion 3202 can include a locking tab 3204. The locking tab 3204 can be transitional between locked and unlocked configurations. When the locking tab 3204 is in the locked configuration, the locking tab 3204 can engage the locking engagement surface 2702 of the adapter 2208. For example the locking tab 3204 can abut locking engagement surface 2702 in the locked configuration, thereby preventing the distal end of the lock-cylinder 3108 from being removed from the lock cavity 2606 of the adapter 2208. That is, when the lock-cylinder 3108 is in the locked configuration, the locking engagement surface 2702 can act as a stop or a catch the locking tab 3204 of the lock-cylinder 3108 if the lock-cylinder (and thus the locking cover 2202 is pulled away from the clamp device 2204 in a direction parallel to the longitudinal axis 3206 of the lock 2210.

In FIG. 32, the lock 2210 can be transitioned between the locked and unlocked configurations by rotating the lock-cylinder 3108 about the longitudinal axis 3206. That is, the longitudinal axis 3206 can be the rotational axis about which the lock 2210 rotates. For example, in FIG. 32, the lock-cylinder 3108 can be rotated 90 degrees to place the lock 2210 in a locked configuration. The locked configuration can correspond to the position of the lock-cylinder 3108 that places the locking tab 3204 of the lock-cylinder 3108 in engagement with the locking engagement surface 2702 of the adapter 2208. The unlocked configuration can correspond to the position of the lock-cylinder 3108 that places the locking tab 3204 of the lock-cylinder 3108 out of engagement with the locking engagement surface 2702 of the adapter 2208. For example, to place the lock-cylinder in the unlocked configuration, the lock-cylinder can 3108 be rotated 90 degrees in a direction opposite to the direction that places the lock-cylinder 3108 in the locked configuration. In another implementation, place the lock-cylinder 3108 in the unlocked configuration, the lock-cylinder can 3108 be rotated another 90 degrees in a direction that is the same as the direction that places the lock-cylinder 3108 in the locked configuration.

While FIG. 32 illustrates that the lock 2210 of locking cover 2202 interacts with a locking engagement surface 2702 of an adapter 2208, the locking engagement surface 2702 can be formed on a surface of the clamp device 2204. For example, the locking engagement surface 2702 can be formed on the second portion 2406 of the body 2402 of the clamp 2204. That is, the locking engagement surface 2702 can be formed on or coupled to the portion or surface of the clamp device 2204 that is adjacent the locking cover 2202 when the locking cover 2202 is in the installed and locked configuration 2203.

While the example implementations illustrated in FIGS. 22-32 describe the locking cover 2202 as having a clamp device engagement portion 2520 that is a rail that engages a complimentarily configured cover engagement receiving portion 2514 that is a track, the locking cover 2202 can engage the clamp device 2204 by other clamp device engagement portions 2520 and cover engagement receiving portions 2514. For example, the locking cover 2202 can be snap-fit, friction fit, press-fit, or conformance fit with the cover engagement receiving portion 2514 of the clamp device 2204. In other implementations, the locking cover 2202 can have clamp device engagement portions 2520 that are pegs, bumps, or other protrusions and that are configured to engage with cover engagement receiving portions 2514 of the clamp device 2204 that are slots, holes, recesses, or other complimentarily configured cover engagement receiving portions 2514.

The locking cover 2202 has been described in relation to FIGS. 22-32 as a separate component from the clamp device 2204 that is removably attachable or couplable to the clamp device 2204. However, the clamp device 2204 can be hingeably coupled or tethered to the clamp device 2204.

While FIGS. 22-32 have been described with respect to a clamp device for a vehicle, the locking cover 2202 described herein can be implemented on any other device having an operator-engageable portion. For example, the locking cover 2202 can be implemented on a door knob, a screw, a bolt, a hitch, or any other similar device or structure.

The various embodiments described above are provided by way of illustration only and should not be construed to limit the scope of the disclosure. Various modifications and changes can be made to the principles described herein without following the example embodiments and applications illustrated and described herein, and without departing from the scope of the disclosure.

What is claimed is:

1. A vehicular mounted load carrier rack comprising:
a load carrier rack coupled to a vehicle by at least one C-clamp device;
each C-clamp device having an operator-engageable portion for securing and releasing the C-clamp device to and from the vehicle; and
a locking cover mounted in an installed and locked position on each C-clamp device, the locking cover shrouding the operator-engageable portion of the respective C-clamp device from unauthorized access in the installed and locked position,
each locking cover comprising:
a slidably removable cover body having perimeter walls defining a receiving cavity within which the operator-engageable portion of a respective C-clamp device is located in the installed and locked position of the cover body on the C-clamp device;
an outer face parallel to a longitudinal axis of the C-clamp device in the installed and locked position; and
a lock for securing the locking cover in the installed and locked position, coupled to the cover body and centered along the longitudinal axis, the lock having an engagement portion transitional between locked and unlocked configurations.

2. The vehicular mounted load carrier rack as recited in claim 1 further comprising:
an adapter installable upon the C-clamp device and configured to receive the cover body in the installed and locked position.

3. The vehicular mounted load carrier rack as recited in claim 1, wherein the cover body further comprises an adapter engagement portion configured to engage a complementarily configured cover engagement receiving portion of the adapter in the installed and locked position.

4. The vehicular mounted load carrier rack as recited in claim 3, wherein the adapter engagement portion is an elongate rail that engages a complementarily configured elongate track of the adapter in the installed and locked position.

5. A locking cover that shrouds the operator-engageable portion of a clamp device, the locking cover comprising:
a slidably removable cover body having perimeter walls defining a receiving cavity therein and within which the operator-engageable portion of a clamp device is located in an installed and locked position of the cover body on the clamp device;
an outer face parallel to a longitudinal axis of the clamp device in the installed and locked position; and
a lock coupled to the cover body and centered along the longitudinal axis, the lock having an engagement portion transitional between locked and unlocked configurations for locking and unlocking the cover body to the clamp device.

6. The locking cover as recited in claim 5, wherein the clamp device is a C-clamp device.

7. The locking cover as recited in claim 5, wherein the cover body further comprises a C-clamp device engagement portion configured to engage a complementarily configured cover engagement receiving portion of the C-clamp device in the installed and locked position.

8. The locking cover as recited in claim 7, wherein the C-clamp engagement portion is an elongate rail that engages a complementarily configured elongate track of the C-clamp device in the installed and locked position.

9. The locking cover as recited in claim 7, wherein the C-clamp engagement portion comprises an elongate engagement surface having a length greater than a width thereof.

10. The locking cover as recited in claim 7, wherein the perimeter walls of the cover body predominantly surround the operator-engageable portion of the C-clamp device in the installed and locked position.

11. The locking cover as recited in claim 10, wherein the perimeter walls of the cover body surround at least half of the operator-engageable portion of the C-clamp device in the installed and locked position.

12. The locking cover as recited in claim 10, wherein the perimeter walls of the cover body substantially surround accessible portions of the operator-engageable portion of the C-clamp device in the installed and locked position.

13. The locking cover as recited in claim 10, wherein at least one of the perimeter walls of the cover body forms an opening sufficiently large to permit the operator-engageable portion of the C-clamp device to pass there-through.

14. The locking cover as recited in claim 6, wherein the cover body has a longitudinal axis oriented substantially parallel to a longitudinal axis of a fastener portion connected to the operator-engageable portion of the C-clamp device in the installed and locked position.

15. The locking cover as recited in claim 14, wherein at least a portion of the receiving cavity of the cover body has a rectangular cross-sectional shape taken perpendicular to the longitudinal axis of the cover body.

16. The locking cover as recited in claim 14, wherein the receiving cavity of the cover body has rectangular cross-sectional shapes when taken perpendicular to the longitudinal axis of the cover body.

17. The locking cover as recited in claim 14, wherein the perimeter walls of the cover body comprise a plurality of substantially planar exterior surfaces oriented substantially parallel to the longitudinal axis of the cover body.

18. The locking cover as recited in claim 14, wherein the perimeter walls of the cover body comprise at least one substantially planar exterior surface oriented substantially orthogonal to the longitudinal axis of the cover body.

19. The locking cover as recited in claim 14, wherein the perimeter walls of the cover body comprise at least one substantially planar exterior surface oriented oblique to the longitudinal axis of the cover body.

20. The locking cover as recited in claim 14, wherein the lock comprises a lock-cylinder portion fixedly connected to the cover body and having a longitudinal axis substantially perpendicular to the longitudinal axis of the cover body.

21. The locking cover as recited in claim 14, wherein the fastener portion is a threaded bolt.

22. The locking cover as recited in claim 14, wherein the lock comprises a lock-cylinder portion fixedly connected to the cover body.

23. A locking device that shrouds the operator-engageable portion of a C-clamp device, the locking device comprising:
 a slidably removable cover body having perimeter walls defining a receiving cavity therein, the receiving cavity configured to shroud an operator-engageable portion of a C-clamp device in an installed and locked position of the cover body on the C-clamp device;
 an outer face parallel to a longitudinal axis of the C-clamp device in the installed and locked position;
 an adapter installable upon the C-clamp device and configured to receive the cover body in the installed and locked position; and
 a releasably engaging lock for locking the cover body to the C-clamp device coupled to the cover body and centered along the longitudinal axis, the lock having an engagement portion transitional between locked and unlocked configurations to the adapter.

24. The locking device as recited in claim 23, wherein the cover body further comprises an adapter engagement portion configured to engage a complementarily configured cover engagement receiving portion of the adapter in the installed and locked position.

25. The locking device as recited in claim 24, wherein the adapter engagement portion is an elongate rail that engages a complementarily configured elongate track of the adapter in the installed and locked position.

* * * * *